(12) United States Patent
Kodera

(10) Patent No.: US 10,358,162 B2
(45) Date of Patent: Jul. 23, 2019

(54) STEERING CONTROL DEVICE

(71) Applicant: JTEKT CORPORATION, Osaka-shi, Osaka (JP)

(72) Inventor: Takashi Kodera, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 39 days.

(21) Appl. No.: 15/713,016

(22) Filed: Sep. 22, 2017

(65) Prior Publication Data
US 2018/0093701 A1    Apr. 5, 2018

(30) Foreign Application Priority Data

Oct. 3, 2016    (JP) .................................. 2016-195621
Oct. 7, 2016    (JP) .................................. 2016-199293

(51) Int. Cl.
*B62D 5/04*     (2006.01)
*B62D 6/00*     (2006.01)
*B62D 5/00*     (2006.01)

(52) U.S. Cl.
CPC ........... *B62D 5/0463* (2013.01); *B62D 5/001* (2013.01); *B62D 5/003* (2013.01); *B62D 5/0478* (2013.01); *B62D 6/002* (2013.01); *B62D 6/007* (2013.01)

(58) Field of Classification Search
CPC ...... B62D 5/0463; B62D 5/003; B62D 6/002; B62D 5/001; B62D 6/007; B62D 5/0478
USPC .......................................................... 701/41
See application file for complete search history.

(56) References Cited

U.S. PATENT DOCUMENTS

2006/0200290 A1    9/2006   Chino et al.

FOREIGN PATENT DOCUMENTS

| EP | 1 510 436 A2 * | 3/2005 | ............ B62D 5/003 |
|---|---|---|---|
| EP | 1510436 A2 | 3/2005 | |
| EP | 1795429 A1 | 6/2007 | |
| JP | 2006-182058 A | 7/2006 | |
| JP | 4725132 B2 | 7/2011 | |
| JP | 2015-013498 A | 1/2015 | |

OTHER PUBLICATIONS

Mar. 1, 2018 Search Report issued in European Patent Application No. 17193268.4.

* cited by examiner

*Primary Examiner* — Brian P Sweeney
(74) *Attorney, Agent, or Firm* — Oliff PLC

(57) ABSTRACT

A steering control device includes a controller configured to execute turning processing of controlling a controlled variable to a command value corresponding to an operation of a steering wheel by controlling a turning-side actuator in a cutoff state, the controlled variable being at least one of a turning angle of the steered wheels and a turning angle rate that is a changing rate of the turning angle; and transmission switching processing of controlling a switching device such that the switching device is switched from the cutoff state to a transmission state on condition that an absolute value of a difference between the controlled variable and the command value continues to be equal to or larger than a threshold when the turning processing is executed.

11 Claims, 13 Drawing Sheets

STEERING CONTROL DEVICE

INCORPORATION BY REFERENCE

The disclosure of Japanese Patent Application No. 2016-195621 filed on Oct. 3, 2016 and Japanese Patent Application No. 2016-199293 filed on Oct. 7, 2016, each including the specification, drawings and abstract, is incorporated herein by reference in its entirety.

BACKGROUND

1. Technical Field

The disclosure relates to a steering control device configured to control a steering system, the steering system including a switching device that is switched between a transmission state and a cutoff state, the transmission state being a state where power is transmitted from a steering wheel to steered wheels, and the cutoff state being a state where transmission of the power from the steering wheel to the steered wheels is cut off; a steering-side actuator configured to apply a steering reaction force to the steering wheel in the cutoff state; and a turning-side actuator configured to turn the steered wheels.

2. Description of Related Art

For example, a control device in a steer-by-wire system is described in Japanese Unexamined Patent Application Publication No. 2006-182058 (JP 2006-182058 A). In the steer-by-wire system, a steering-side actuator applies a reaction force to a steering wheel in a cutoff state where transmission of power from the steering wheel to steered wheels is cut off. In the cutoff state, this control device controls a turning-side actuator to control a detected value of a pinion angle, which corresponds to a turning angle, to a target pinion angle (the paragraph [0014]). In the cutoff state, the control device also controls a steering-side motor to control a detected value of steering torque to target steering reaction torque (the paragraph [0015]).

In addition, for example, in Japanese Unexamined Patent Application Publication No. 2015-13498 (JP 2015-13498 A), it is described that a current that flows through a motor provided in a turning-side actuator is limited when a temperature of the turning-side actuator, which turns the steered wheels, is high.

In Japanese Patent No. 4725132, a control device in a steer-by-wire system is described. In the steer-by-wire system, a steering-side actuator applies a reaction force to a steering wheel when transmission of power from the steering wheel to steered wheels is cut off, that is, when a backup clutch (a switching device) is in a cutoff state.

SUMMARY

In JP 2006-182058 A, in the case where a load applied to the turning-side actuator is excessively large, for example, in the case where the steered wheel is stuck in a groove, the turning-side actuator cannot turn the steered wheels in accordance with the operation of the steering wheel. Accordingly, a steering angle as a rotation amount of the steering wheel may not conform to the turning angle of the steered wheel.

The present inventor examined limiting the current in the steer-by-wire system in Japanese Patent No. 4725132 when the temperature of the steering-side actuator is high, as well as when the temperature of the turning-side actuator is high. However, when the current in the steering-side actuator is limited, the maximum value of the reaction force that can be applied to the steering wheel is reduced and a magnitude of the steering angle becomes excessively large for the turning angle. When the current in the turning-side actuator is limited, torque that turns the steered wheels becomes insufficient, and the turning angle may not conform to the steering angle. Thus, when the current in the steering-side actuator or the turning-side actuator is limited, the turning angle may not conform to the steering angle.

The disclosure provides a steering control device capable of suppressing occurrence of a situation where a steering angle and a turning angle do not conform to each other when a load applied to a turning-side actuator is increased.

The disclosure also provides a steering control device capable of suppressing occurrence of a situation where a steering angle and a turning angle do not conform to each other when a temperature of a turning-side actuator or a steering-side actuator is high, in a steering system including a switching device that is switched between a transmission state and a cutoff state, the transmission state being a state where power is transmitted from a steering wheel to steered wheels, and the cutoff state being a state where transmission of the power from the steering wheel to the steered wheels is cut off.

An aspect of the disclosure relates to a steering control device configured to control a steering system including a switching device that is switched between a transmission state and a cutoff state, the transmission state being a state where power is transmitted from a steering wheel to steered wheels, and the cutoff state being a state where transmission of the power from the steering wheel to the steered wheels is cut off; a steering-side actuator configured to apply a steering reaction force to the steering wheel in the cutoff state; and a turning-side actuator configured to turn the steered wheels. The steering control device includes a controller configured to execute: turning processing of controlling a controlled variable to a command value corresponding to an operation of the steering wheel by controlling the turning-side actuator in the cutoff state, the controlled variable being at least one of a turning angle of the steered wheels and a turning angle rate that is a changing rate of the turning angle; and transmission switching processing of controlling the switching device such that the switching device is switched from the cutoff state to the transmission state on condition that an absolute value of a difference between the controlled variable and the command value continues to be equal to or larger than a threshold when the turning processing is executed.

In the case where the absolute value of the difference between the controlled variable and the command value thereof continues to be equal to or larger than the threshold, the steering angle may not conform to the turning angle. In this regard, in the above configuration, the switching device is switched to the transmission state in this case, and thus torque that is input to the steering wheel by a user can be applied to the steered wheels. Accordingly, when a load applied to the turning-side actuator is increased, it is possible to suppress occurrence of a situation where the steering angle and the turning angle do not conform to each other.

In the steering control device according to the above aspect, the controller may be configured to execute assist processing of assisting in turning of the steered wheels caused by the operation of the steering wheel, with use of at least one of the steering-side actuator and the turning-side actuator in a case where the switching device is switched to the transmission state by the transmission switching processing.

In the above configuration, the assist processing is executed in the transmission state. Accordingly, the steered wheels can be turned through cooperation of steering torque that is input to the steering wheel by the user and a force of at least one of the steering-side actuator and the turning-side actuator, the force turning the steered wheels.

In the steering control device according to the above aspect, in the turning processing, the turning-side actuator may be controlled based on an output value of an integral element obtained by using, as an input, the difference between the controlled variable and the command value; and in the assist processing, in the case where the switching device is switched to the transmission state by the transmission switching processing, a value held by the integral element at a time point at which the switching device is switched to the transmission state may not be reflected in control of the turning-side actuator.

The transmission switching processing is executed when the absolute value of the difference between the controlled variable and the command value thereof continues to be equal to or larger than the threshold. Accordingly, the absolute value of the value held by the integral element at the time point at which the switching device is switched by the transmission switching processing may be extremely large. In this case, if the value held by the integral element is reflected in the control of the turning-side actuator in the transmission state, there is a possibility that the output of the turning-side actuator may excessively deviate from an appropriate value. Thus, in the above configuration, the above held value is not reflected.

In the steering control device according to the above aspect, in the turning processing, the controlled variable may be the turning angle; the controller may be configured to execute determination processing of determining whether the absolute value of the difference between the controlled variable and the command value continues to be equal to or larger than the threshold when the turning processing is executed by using, as inputs, a detected value of the turning angle and a command value of the turning angle; and the controller may be configured to execute the transmission switching processing based on a result of the determination processing.

In the above configuration, the transmission switching processing can be reliably executed by executing the determination processing when the absolute value of the difference between the actual turning angle and the command value thereof continues to be equal to or larger than the threshold value.

In the steering control device according to the above aspect, the controller may be configured to execute: acquisition processing of acquiring a temperature of one of the steering-side actuator and the turning-side actuator; current limit processing of limiting a current flowing through one of the steering-side actuator and the turning-side actuator in a case where the temperature acquired by the acquisition processing is equal to or higher than a first threshold temperature when the switching device is in the transmission state; and switching processing of controlling the switching device such that the switching device is switched from the cutoff state to the transmission state in a case where the temperature acquired by the acquisition processing is equal to or higher than a second threshold temperature that is lower than the first threshold temperature when the switching device is in the cutoff state.

In the above configuration, when the temperature acquired by the acquisition processing is equal to or higher than the second threshold temperature, the switching device is switched to the transmission state by the switching processing. Accordingly, the steering wheel and the steered wheels are mechanically connected, and thus, it is possible to suppress occurrence of a situation where the steering angle and the turning angle do not conform to each other when the temperature of the turning-side actuator or the steering-side actuator is high. Further, when the temperature is equal to or higher than the second threshold temperature that is lower than the first threshold temperature, the switching device is switched to the transmission state. Accordingly, the switching device can be switched to the transmission state before limitation is imposed by the current limit processing, and thus, it is possible to switch the switching device to the transmission state well in advance.

In the steering control device according to the above aspect, the acquisition processing may be turning-side temperature acquisition processing of acquiring the temperature of the turning-side actuator; and the controller may be configured to execute assist processing of controlling at least one of the steering-side actuator and the turning-side actuator to assist in turning of the steered wheels caused by the operation of the steering wheel in a case where the switching device is switched to the transmission state by the switching processing.

In the above configuration, when the temperature of the turning-side actuator is high, the switching device is switched to the transmission state, and the assist processing of assisting in the turning of the steered wheels caused by the operation of the steering wheel is executed. In the assist processing, the steered wheels are turned through the cooperation of the steering torque, which is input to the steering wheel, and the force provided by the actuator. Accordingly, as compared to the case where the switching device is not switched to the transmission state, it is possible to reduce the current required for the turning-side actuator.

In the steering control device according to the above aspect, the controller may be configured not to use the turning-side actuator in the assist processing in the case where the switching device is switched to the transmission state by the switching processing. In the above configuration, the turning-side actuator is not used in the assist processing when the temperature of the turning-side actuator is high. Thus, as compared to the case where the turning-side actuator is used, it is possible to suppress an increase in the temperature of the turning-side actuator.

In the steering control device according to the above aspect, the controller may be configured to execute switching temperature acquisition processing of acquiring a temperature of the switching device; the switching device may be a normally-closed switching device; the switching processing may include processing of controlling the switching device such that the switching device is switched from the cutoff state to the transmission state in a case where the temperature acquired by the switching temperature acquisition processing is equal to or higher than a specified temperature when the switching device is in the cutoff state; and the controller may be configured to execute assist processing of controlling at least one of the steering-side actuator and the turning-side actuator to assist in turning of the steered wheels caused by the operation of the steering wheel in a case where the switching device is switched to the transmission state by the switching processing based on a fact that the temperature acquired by the switching temperature acquisition processing is equal to or higher than the specified temperature.

When the temperature of the switching device is increased, a request for reducing the current thereof may be made to protect the switching device. In this case, there is a possibility that the cutoff state cannot be stably maintained. Accordingly, in the above configuration, the switching device is switched to the transmission state when the temperature of the switching device is equal to or higher than the specified temperature. Thus, it is possible to suppress occurrence of a situation where the switching device is brought into the transmission state at unintended timing.

In the steering control device according to the above aspect, the acquisition processing may be steering-side temperature acquisition processing of acquiring the temperature of the steering-side actuator; and the controller may be configured to execute assist processing of controlling at least one of the steering-side actuator and the turning-side actuator to assist in turning of the steered wheels caused by the operation of the steering wheel in a case where the switching device is switched to the transmission state by the switching processing.

When the temperature of the steering-side actuator is high, a request for reducing the current thereof may be made to protect the steering-side actuator. In this case, there is a possibility that the sufficient reaction force cannot be applied to the steering wheel. Accordingly, in the above configuration, the reaction force from the steered wheels can be transmitted to the steering wheel by switching the switching device to the transmission state, and thus, it is possible to suppress occurrence of a situation where the reaction force applied to the steering wheel becomes insufficient.

In the steering control device according to the above aspect, the controller may be configured not to use the steering-side actuator in the assist processing in the case where the switching device is switched to the transmission state by the switching processing. In the above configuration, the steering-side actuator is not used in the assist processing when the temperature of the steering-side actuator is high. Thus, as compared to the case where the steering-side actuator is used, it is possible to suppress an increase in the temperature of the steering-side actuator.

In the steering control device according to the above aspect, the controller may be configured to execute: steering angle command value setting processing of setting a steering angle command value based on the operation of the steering wheel; steering-side control processing of controlling the steering-side actuator to control a steering angle to the steering angle command value through feedback; turning angle command value setting processing of setting a turning angle command value based on the operation of the steering wheel; turning-side control processing of controlling the turning-side actuator to control the turning angle to the turning angle command value through feedback; variable setting processing of variably setting a command value of a steering angle ratio that is a ratio between the turning angle command value and the steering angle command value when the switching device is in the cutoff state; and stop processing of stopping variably setting the ratio between the turning angle command value and the steering angle command value in a case where the switching device is switched to the transmission state by the switching processing.

In the transmission state, the steering angle ratio is fixed. Thus, if the processing of variably setting the ratio between the steering angle command value and the turning angle command value is executed, the processing of controlling the turning angle to the turning angle command value through feedback may not conform to the processing of controlling the steering angle to the steering angle command value through feedback. Thus, the variable setting processing of variably setting the command value of the steering angle ratio is stopped by the stop processing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
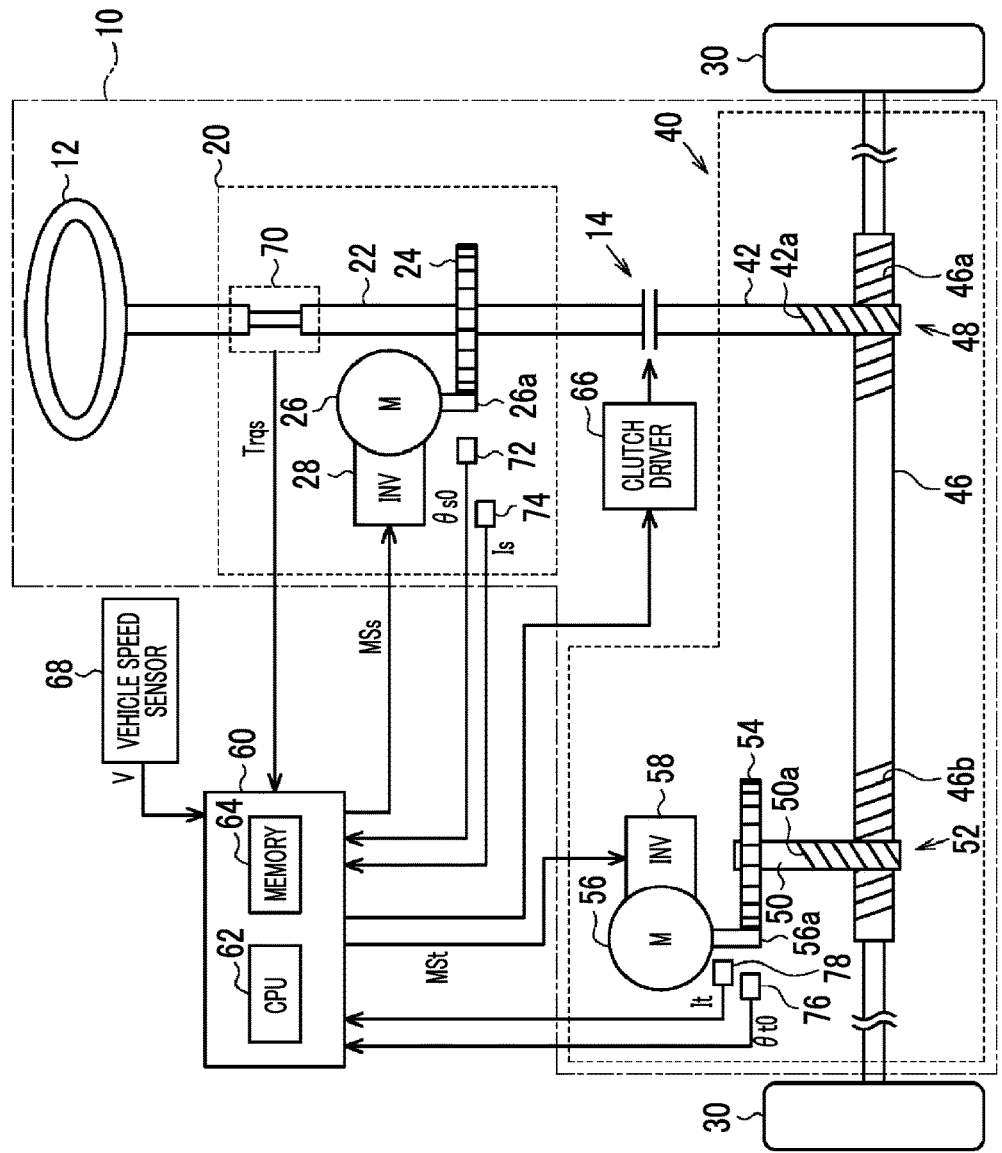
FIG. 1 is a view of a steering control device according to a first embodiment and a control target thereof.

A steering control device according to a first embodiment will be described with reference to the drawings. As shown in FIG. 1, in a steering system 10 according to this embodiment, a steering wheel 12 is connected to a steering-side actuator 20 that applies a reaction force as a force resisting against an operation of the steering wheel 12. The steering-side actuator 20 includes a steering shaft 22 that is fixed to the steering wheel 12, a reaction force-side speed reducer (a steering-side speed reducer) 24, a steering-side motor 26 having a rotational shaft 26a connected to the reaction force-side speed reducer 24, and an inverter 28 that drives the steering-side motor 26. Note that, in this embodiment, the steering-side motor 26 is assumed to be a surface permanent magnet synchronous motor (the SPMSM).

The steering shaft 22 can be connected to a pinion shaft 42 of a turning-side actuator 40 via a normally-closed type clutch 14. The turning-side actuator 40 includes a first rack-and-pinion mechanism 48, a second rack-and-pinion mechanism 52, a turning-side speed reducer 54, a turning-side motor 56 having a rotational shaft 56a connected to the turning-side speed reducer 54, and an inverter 58 that drives the turning-side motor 56. Note that, in this embodiment, the turning-side motor 56 is assumed to be the SPMSM.

The first rack-and-pinion mechanism 48 includes a rack shaft 46 and the pinion shaft 42 that are arranged at a specified crossing angle, and first rack teeth 46a formed on the rack shaft 46 mesh with pinion teeth 42a formed on the pinion shaft 42. Note that steered wheels 30 are respectively connected to both ends of the rack shaft 46 via tie rods.

The second rack-and-pinion mechanism 52 includes the rack shaft 46 and a pinion shaft 50 that are arranged at a specified crossing angle, and second rack teeth 46b formed on the rack shaft 46 mesh with pinion teeth 50a formed on the pinion shaft 50.

The pinion shaft 50 is connected to the rotational shaft 56a of the turning-side motor 56 via the turning-side speed reducer 54. The inverter 58 is connected to the turning-side motor 56. A control device 60 executes control of turning the steered wheels 30 in accordance with the operation of the steering wheel 12 by controlling the steering system 10 that includes the steering-side actuator 20 and the turning-side actuator 40. That is, in this embodiment, a steer-by-wire system is realized by the steering-side actuator 20 and the turning-side actuator 40, and the control device 60 normally executes the control of turning the steered wheels 30 in accordance with the operation of the steering wheel 12 while maintaining the clutch 14 in a disengaged state. At this time, the control device 60 acquires an output value of a torque sensor 70 that detects torque (steering torque Trqs) applied to the steering shaft 22, an output value of a steering-side angle sensor 72 that detects a rotation angle θs0 of the rotational shaft 26a of the steering-side motor 26, and an output value of a steering-side current sensor 74 that detects a current Is flowing through the steering-side motor 26. The control device 60 also acquires an output value of a turning-side angle sensor 76 that detects a rotation angle θt0 of the rotational shaft 56a, an output value of a turning-side current sensor 78 that detects a current It flowing through the turning-side motor 56, and an output value of a vehicle speed sensor 68 that detects a vehicle speed V.

Figure 2:
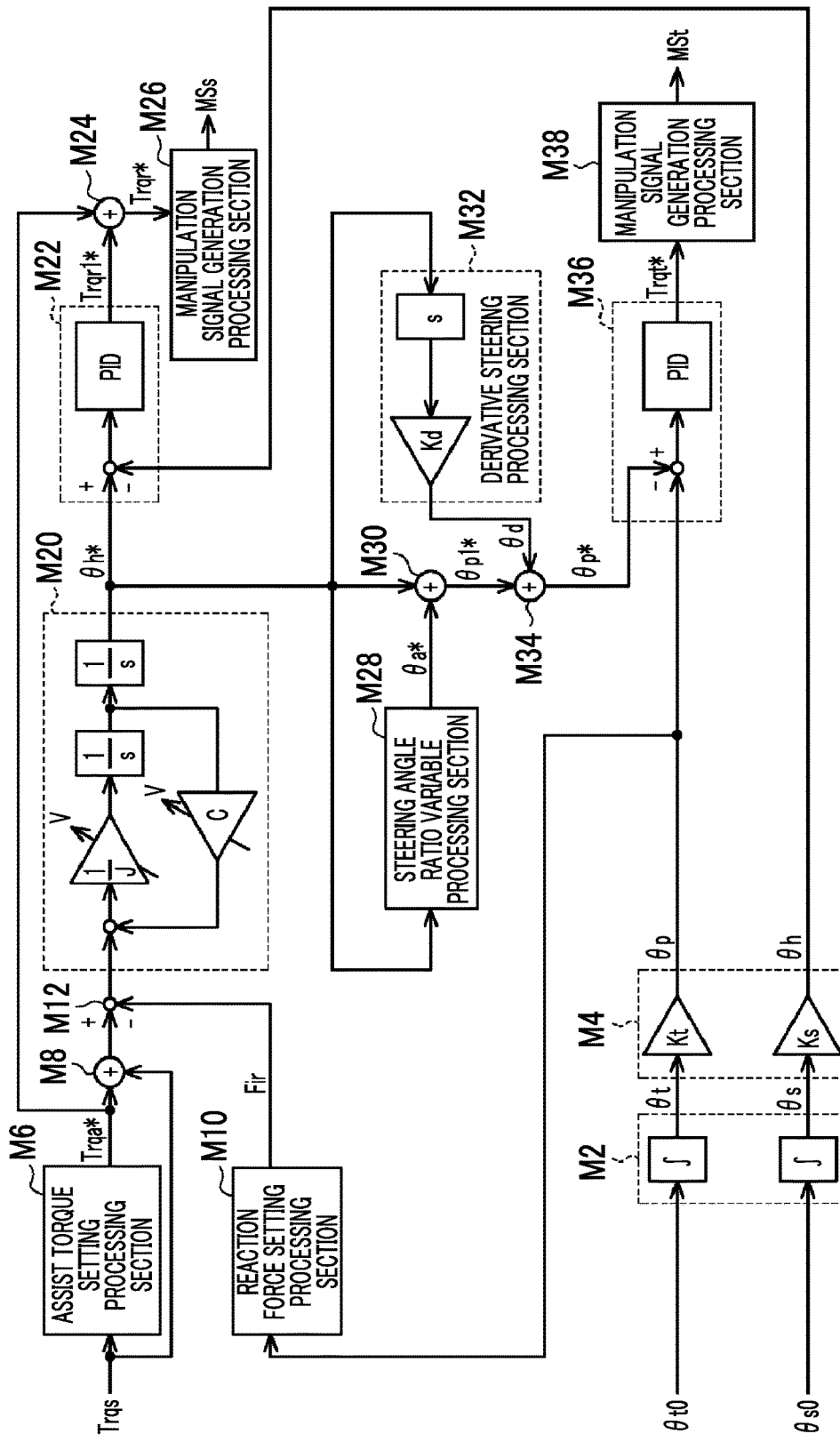
FIG. 2 is a block diagram according to the embodiment.

The control device 60 includes a central processing unit (CPU) 62 and a memory 64 and executes various kinds of processing when the CPU 62 executes programs stored in the memory 64. FIG. 2 shows part of the processing executed when the clutch 14 is in the disengaged state among the various kinds of processing realized when the CPU 62 executes the programs stored in the memory 64.

An integration processing section M2 converts the rotation angle θs0, which is detected by the steering-side angle sensor 72, and the rotation angle θt0, which is detected by the turning-side angle sensor 76, to numerical values that fall within an angle range wider than an angle range of 0 to 360° and sets the numerical values as rotation angles θs, θt. That is, for example, when the steering wheel 12 is turned from a neutral position, at which a vehicle travels straight, to a maximum position on a right side or a left side, the rotational shaft 26a rotates by an angle exceeding 360°. Accordingly, for example, when the rotational shaft 26a makes two turns in a specified direction from a state where the steering wheel 12 is at the neutral position, the integration processing section M2 outputs a value of 720°. Note that, at the neutral position, the output value of the integration processing section M2 is zero.

A measure unit setting processing section M4 multiplies the output value of the steering-side angle sensor 72, which has been processed by the integration processing section M2, by a conversion coefficient Ks to compute a steering angle θh, and multiplies the output value of the turning-side angle sensor 76, which has been processed by the integration processing section M2, by a conversion coefficient Kt to compute a turning angle θp. Here, the conversion coefficient Ks is set in accordance with a rotational speed ratio between the reaction force-side speed reducer 24 and the rotational shaft 26a of the steering-side motor 26, and thus, a change amount of the rotation angle θs of the rotational shaft 26a is converted to a rotation amount of the steering wheel 12. Thus, the steering angle θh is a rotation angle of the steering wheel 12 with respect to the neutral position. In addition, the conversion coefficient Kt is a product of a rotational speed ratio between the turning-side speed reducer 54 and the rotational shaft 56a of the turning-side motor 56 and a rotational speed ratio between the pinion shaft 50 and the pinion shaft 42. In this way, a rotation amount of the rotational shaft 56a is converted to the rotation amount of the steering wheel 12 on the assumption that the clutch 14 is engaged.

Note that, in the processing shown in FIG. 2, each of the rotation angles θs, θt, the steering angle θh, and the turning angle θp is a positive value when the angle is a rotation angle in the specified direction, and is a negative value when the angle is a rotation angle in an opposite direction. That is, for example, when the rotational shaft 26a rotates in the direction opposite to the specified direction from the state where the steering wheel 12 is at the neutral position, the integration processing section M2 outputs the negative value. However, this is merely one example of logic of a control system. In particular, in this specification, a state where each of the rotation angles θs, θt, the steering angle θh, and the turning angle θp is large signifies that the rotation amount from the neutral position is large, that is, each parameter that can have either the positive value or the negative value as described above has a large absolute value.

An assist torque setting processing section M6 sets assist torque Trqa* on the basis of the steering torque Trqs. The assist torque Trqa* is set to be a larger value as the steering torque Trqs is increased. An addition processing section M8 adds the steering torque Trqs to the assist torque Trqa* and outputs an added value.

A reaction force setting processing section M10 sets a reaction force Fir that is a force resisting against the rotation of the steering wheel 12. In detail, in this embodiment, the reaction force setting processing section M10 receives the turning angle θp and sets a magnitude of the reaction force Fir to a large value when a magnitude of the turning angle θp is large as compared to a case where the magnitude of the turning angle θp is small.

A deviation computation processing section M12 outputs a value that is obtained by subtracting the reaction force Fir from the output of the addition processing section M8. A steering angle command value computation processing section M20 sets a steering angle command value θh* on the basis of the output value of the deviation computation processing section M12. Here, a model equation expressed by the following equation (c1) that correlates an output value Δ of the deviation computation processing section M12 with the steering angle command value θh* is used.

$$\Delta = C \cdot \theta h^{*\prime} + J \cdot \theta h^{*\prime\prime} \tag{c1}$$

A model that is expressed by the above equation (c1) is a model that defines a relationship between an axial force of the rack shaft 46 and the steering angle θh in the steering system 10 in which the steering wheel 12 is mechanically connected to the steered wheels 30. In the above equation (c1), a viscosity coefficient C models friction or the like of the steering system 10, and an inertia coefficient J models inertia of the steering system 10. Here, the viscosity coefficient C and the inertia coefficient J are variably set in accordance with the vehicle speed V.

A steering angle feedback processing section M22 sets feedback torque Trqr1* as a manipulative variable that is used for controlling the steering angle θh to the steering angle command value θh* through feedback. More specifically, a sum of output values of a proportional element, an integral element, and a derivative element is set as the feedback torque Trqr1*, the output values of the proportional element, the integral element, and the derivative element being obtained by using, as an input, a value obtained by subtracting the steering angle θh from the steering angle command value θh*.

An addition processing section M24 outputs a sum of the feedback torque Trqr1* that is output by the steering angle feedback processing section M22, and the assist torque Trqa* that is output by the assist torque setting processing section M6, as a torque command value (a reaction force command value (a steering-side torque command value) Trqr*) for the steering-side motor 26.

A manipulation signal generation processing section M26 generates a manipulation signal MSs for the inverter 28 on the basis of the reaction force command value Trqr* and outputs the manipulation signal MSs to the inverter 28. This can be realized, for example, by known current feedback control in which a command value of a q-axis current is set on the basis of the reaction force command value Trqr* and d,q-axes voltage command values are set as manipulative variables used for controlling d, q-axes currents to the command values through feedback. Note that the d-axis current may be controlled to zero; however, when a rotational speed of the steering-side motor 26 is high, an absolute value of the d-axis current may be set to a larger value than zero, and weak field control may be executed. The absolute value of the d-axis current can be set to a larger value than zero in a low rotational speed region.

A steering angle ratio variable processing section M28 sets a target operation angle θa* on the basis of the steering angle command value θh*, the target operation angle θa* being used to variably set a steering angle ratio as a ratio between the steering angle θh and the turning angle θp. An addition processing section M30 computes a turning angle command value θp1* by adding the target operation angle θa* to the steering angle command value θh*.

A derivative steering processing section M32 outputs a value, which is obtained by multiplying a changing rate of the steering angle command value θh* by a gain Kd, as a steering correction amount θd. A steering correction processing section M34 computes a turning angle command value θp* by adding the steering correction amount θd to the turning angle command value θp1* and outputs the turning angle command value θp*.

A turning angle feedback processing section M36 sets a torque command value (a turning-side torque command value Trqt*) for the turning-side motor 56, as the manipulative variable for controlling the turning angle θp to the turning angle command value θp* through feedback. More specifically, the sum of the output values of the proportional element, the integral element, and the derivative element is set as the turning-side torque command value Trqt*, the output values of the proportional element, the integral element, and the derivative element being obtained by using, as an input, a value obtained by subtracting the turning angle θp from the turning angle command value θp*.

A manipulation signal generation processing section M38 generates a manipulation signal MSt for the inverter 58 on the basis of the turning-side torque command value Trqt* and outputs the manipulation signal MSt to the inverter 58. This can be performed in a manner similar to the manipulation signal generation processing performed by the manipulation signal generation processing section M26.

According to the above processing, in the disengaged state of the clutch 14, that is, in a state where power transmission from the steering wheel 12 to the steered wheels 30 is cut off, the steered wheels 30 can be turned in accordance with the operation of the steering wheel 12. In this embodiment, basically, the processing of turning the steered wheels 30 in accordance with the operation of the steering wheel 12 in the disengaged state of the clutch 14 is executed by using the processing shown in FIG. 2. However, processing of turning the steered wheels 30 in an engaged state of the clutch 14 is executed under a specified condition. Next, this processing will be described.

Figure 3:
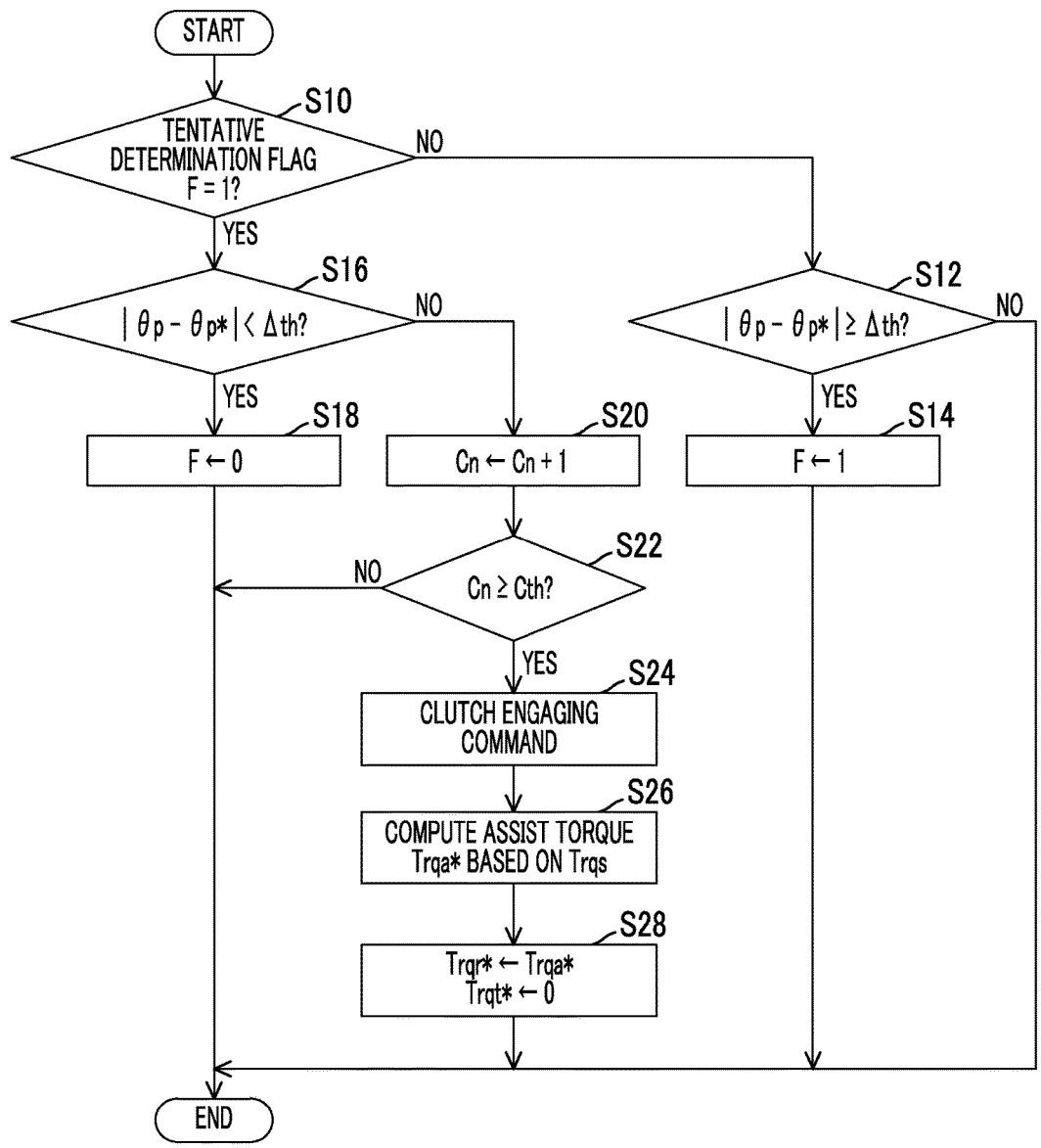
FIG. 3 is a flowchart showing a procedure of processing for dealing with a large load state according to the embodiment.

FIG. 3 shows a procedure of determination processing for determining whether to engage the clutch 14 and engagement processing for the clutch 14. The processing shown in FIG. 3 is realized when the CPU 62 repeatedly executes the program stored in the memory 64 in specified cycles. Note that, in the following description, step numbers will be described by numbers with "S" disposed ahead of the numbers.

In a series of the processing shown in FIG. 3, the CPU 62 first determines whether a tentative determination flag F is "1" (S10). The tentative determination flag F becomes "1" when a tentative determination that an excess load is applied to the turning-side actuator 40 is made on the basis of a fact that an absolute value of a difference between the turning angle θp and the turning angle command value θp1* becomes equal to or larger than a threshold Δth, and becomes "0" when the tentative determination that an excess load is applied to the turning-side actuator 40 is not made. When determining that the tentative determination flag F is "0" (S10: NO), the CPU 62 determines whether the absolute value of the difference between the turning angle θp and the turning angle command value θp1* is equal to or larger than the threshold Δth (S12). Then, when determining that the absolute value is equal to or larger than the threshold Δth (S12: YES), the CPU 62 sets the tentative determination flag F to "1" (S14).

When determining that the tentative determination flag F is "1" (S10: YES), the CPU 62 determines whether the absolute value of the difference between the turning angle θp and the turning angle command value θp1* is smaller than the threshold Δth (S16). This processing is processing for determining whether to initialize the tentative determination flag F. Then, when determining that the absolute value is smaller than the threshold Δth (S16: YES), the CPU 62 sets the tentative determination flag F to "0" (S18).

When determining that the absolute value is equal to or larger than the threshold Δth (S16: NO), the CPU 62 increments a value of a counter Cn that counts a duration time of a state where the absolute value is equal to or larger than the threshold Δth (S20). Next, the CPU 62 determines whether the counter Cn is equal to or larger than a specified value Cth (S22). Here, the specified value Cth is set to a value at which it is possible to determine that there is a high possibility that the turning-side actuator 40 cannot control the turning angle θp to the turning angle command value θp* by itself. Then, when determining that the value of the counter Cn is equal to or larger than the specified value Cth (S22: YES), the CPU 62 outputs a clutch engaging command for the clutch 14 (i.e., a command for engaging the clutch 14) (S24). In this way, the CPU 62 controls a clutch driver 66 to bring the clutch 14 into the engaged state. More specifically, the CPU 62 stops energizing the clutch 14.

Next, the CPU 62 computes the assist torque Trqa* on the basis of the steering torque Trqs (S26). This processing is similar to the processing executed by the assist torque setting processing section M6; however, a value of the assist torque Trqa* is not always equal to the value set by the assist torque setting processing section M6. This is because, in the processing in S26, the CPU 62 sets the assist torque Trqa* on the assumption that the clutch 14 is in the engaged state.

Then, the CPU 62 sets the reaction force command value Trqr* to the assist torque Trqa* and sets the turning-side torque command value Trqt* to zero (S28). That is, when the clutch 14 is engaged, the reaction force command value Trqr* and the turning-side torque command value Trqt* are not computed by the processing in FIG. 2 and are computed by the processing in S26 and S28.

Note that, when the processing in S14, S18, or S28 is completed, or when a negative determination is made in the processing in S12 or S22, the CPU 62 ends the series of the processing shown in FIG. 3. Here, effects of this embodiment will be described.

The CPU 62 executes the processing of controlling the turning-side actuator 40 in the disengaged state of the clutch 14 on the basis of the processing shown in FIG. 2, so as to control the turning angle θp to the turning angle command value θp*, which is set in accordance with the operation of the steering wheel 12. In this control, in the case where an absolute value of a difference between the turning angle command value θp* and the turning angle θp continues to be equal to or larger than the threshold Δth, for example, when the steered wheel 30 is stuck in a groove, the CPU 62 engages the clutch 14 to control the torque of the turning-side motor 56 to zero, and generates the assist torque with the use of the steering-side motor 26. Here, when the clutch 14 is brought into the engaged state, the steering torque Trqs, which is input to the steering wheel 12 by a user, is transmitted to the steered wheels 30. Accordingly, the steered wheels 30 can be turned through cooperation of the torque of the steering-side motor 26 and the steering torque Trqs. In this way, as compared to a case where the clutch 14 is not engaged, excess heat generation by the steering system 10 can be suppressed. That is, in the case where the absolute value of the difference between the turning angle command value θp* and the turning angle θp continues to be large when the clutch 14 is not engaged, the torque of the turning-side motor 56 is fixed at a maximum value, and a heat generation amount is increased.

According to this embodiment that has been described so far, the following effect is further obtained. (1) In the case where the clutch 14 is switched to the engaged state, a value held by the integral element of the turning angle feedback processing section M36 at the time point of switching is not reflected in the manipulation signal MSt for the turning-side actuator 40 (S28). In this way, it is possible to suppress occurrence of a situation where the torque of the turning-side motor 56 after the clutch 14 is brought into the engaged state excessively deviates from an appropriate value (the turning-side torque command value Trqt*).

Hereinafter, a second embodiment will be described with reference to the drawings, with a focus on differences between the second embodiment and the first embodiment.

Figure 4:
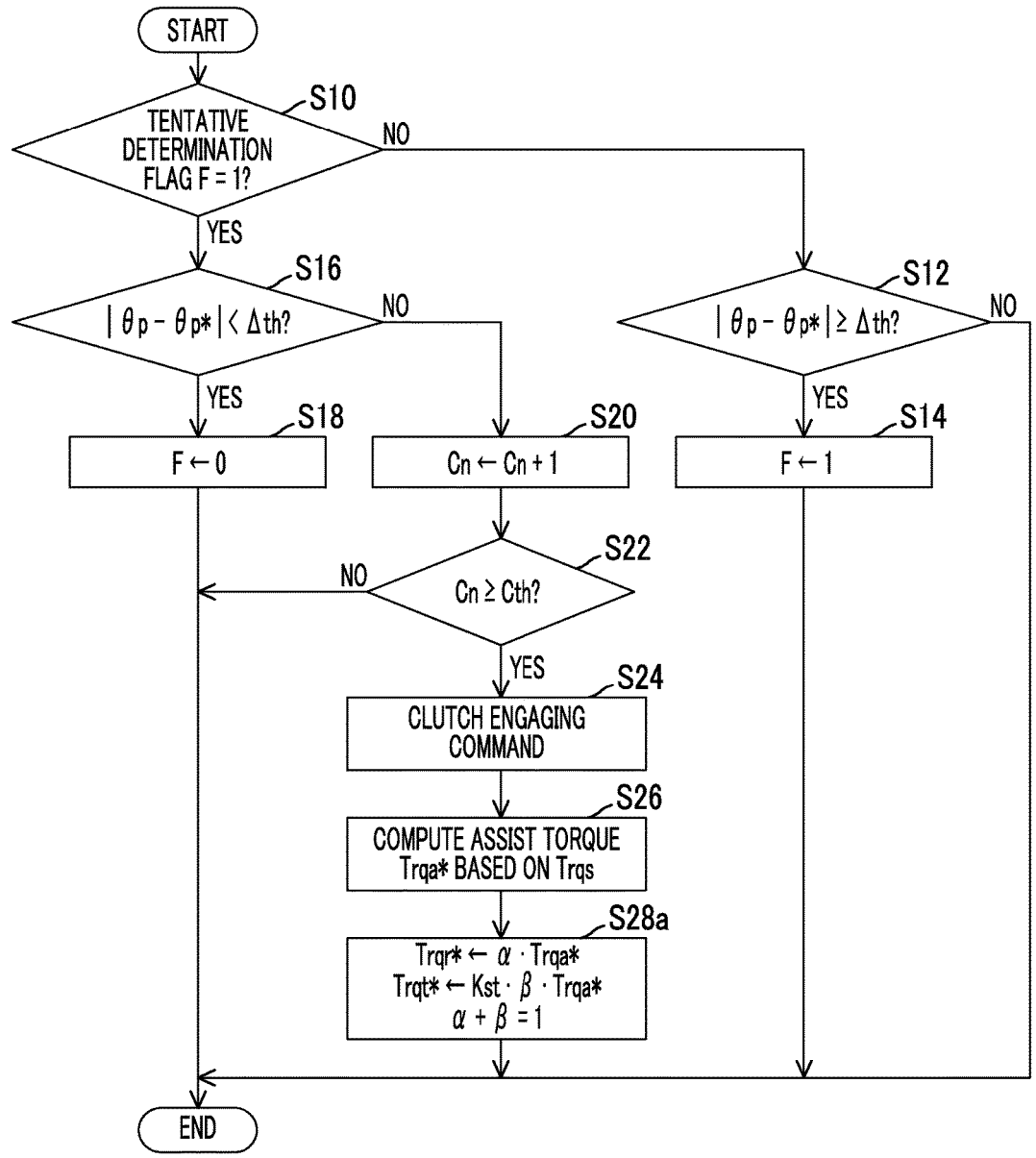
FIG. 4 is a flowchart showing a procedure of processing for dealing with a large load according to a second embodiment.

FIG. 4 shows a procedure of the processing for determining whether to engage the clutch 14 and the engagement processing for the clutch 14. The processing shown in FIG. 4 is realized when the CPU 62 repeatedly executes the program stored in the memory 64 in specified cycles. Here, the processing in FIG. 4 corresponding to that shown in FIG. 3 is denoted by the same step numbers for convenience of the description, and a description thereon will not be made.

In a series of the processing shown in FIG. 4, when the processing in S26 is completed, the CPU 62 allocates the assist torque Trqa* to the reaction force command value Trqr* and the turning-side torque command value Trqt* (S28a). In detail, when coefficients α, β are positive numbers whose sum is "1", the reaction force command value Trqr* is set to "α·Trqa*", and the turning-side torque command value Trqt* is set to "Kst·β·Trqa*". Here, a coefficient Kst is determined by the rotational speed ratio between the rotational shaft 26a and the rotational shaft 56a in the engaged state of the clutch 14, and is a conversion coefficient used to make the torque of the rotational shaft 26a equivalent to the torque of the rotational shaft 56a.

Note that, when the processing in S28a is completed, the CPU 62 ends the series of the processing shown in FIG. 4. According to the above processing, when the clutch 14 is brought into the engaged state, the steered wheels 30 can be turned through cooperation of the torque of the turning-side motor 56, the torque of the steering-side motor 26, and the steering torque Trqs. Thus, as compared to a case where the torque of the turning-side motor 56 is controlled to zero, a maximum value of the assist torque Trqa* can be set to a large value.

Hereinafter, a third embodiment will be described with reference to the drawings, with a focus on differences between the third embodiment and the first embodiment.

Figure 5:
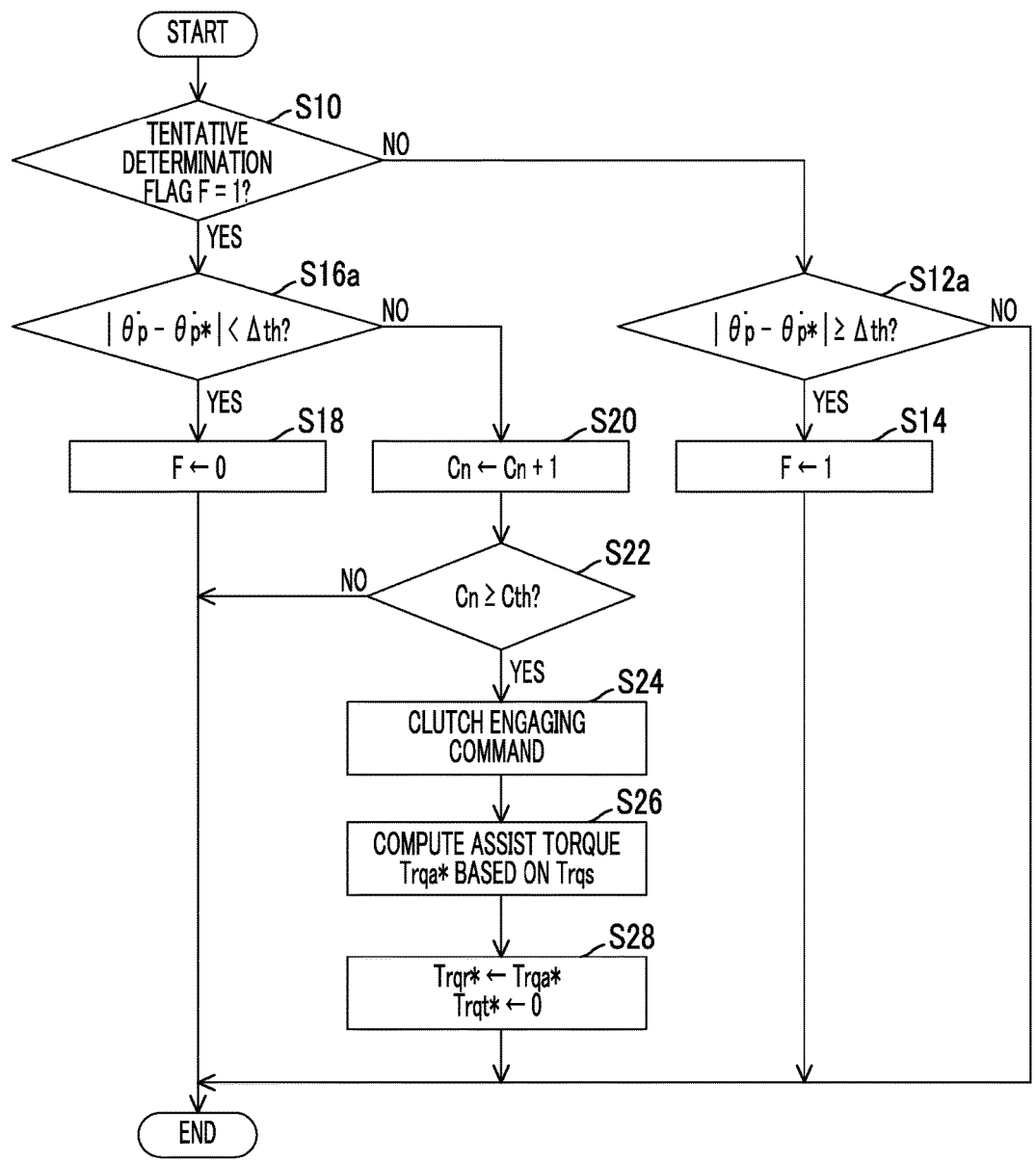
FIG. 5 is a flowchart showing a procedure of processing for dealing with a large load according to a third embodiment.

FIG. 5 shows a procedure of the determination processing for determining whether to engage the clutch 14 and the engagement processing for the clutch 14. The processing shown in FIG. 5 is realized when the CPU 62 repeatedly executes the program stored in the memory 64 in specified cycles. Here, the processing in FIG. 5 corresponding to that shown in FIG. 3 is denoted by the same step numbers for convenience of the description, and a description thereon will not be made.

In a series of the processing shown in FIG. 5, when determining that the tentative determination flag F is "0" (S10: NO), the CPU 62 determines whether an absolute value of a difference between a changing rate of the turning angle θp and a changing rate of the turning angle command value θp* is equal to or larger than a threshold Δth (S12a). This processing is processing for making a tentative determination that an excessively large load is applied to the turning-side actuator 40. That is, when the load is excessively large, the turning angle θp cannot be promptly changed in spite of the high changing rate of the turning angle command value θp*. Accordingly, based on the absolute value of the difference described above, it is determined whether the load is excessively large. Note that the difference between the changing rate of the turning angle θp and the changing rate of the turning angle command value θ* may be a value obtained by dividing an output value of the derivative element of the turning angle feedback processing section M36 by a derivative gain.

When determining that the absolute value is equal to or larger than the threshold Δth (S12a: YES), the CPU 62 sets the tentative determination flag F to "1" (S14). When determining that the tentative determination flag F is "1" (S10: YES), the CPU 62 determines whether the absolute value of the difference between the changing rate of the turning angle θp and the changing rate of the turning angle command value θp* is smaller than the threshold Δth (S16a). Then, when determining that the absolute value is smaller than the threshold Δth (S16a: YES), the CPU 62 sets the tentative determination flag F to "0 (zero)" (S18). When the CPU 62 determines that the absolute value is equal to or larger than the threshold Δth (S16a: NO), the processing proceeds to the processing in S20.

The switching device may be regarded as the clutch 14 and the clutch driver 66, the turning processing may be regarded as the processing executed by the turning angle feedback processing section M36 and the manipulation signal generation processing section M38, and the transmission switching processing may be regarded as the processing in S24.

The assist processing may be regarded as the processing in S28, S28a. In FIG. 3 and FIG. 5, the processing, in which the value held by the integral element is not reflected, is realized by setting the turning-side torque command value Trqt* to zero. In FIG. 4, the processing, in which the value held by the integral element is not reflected, is realized by the processing in S28a in which the turning-side torque command value Trqt* is calculated independently of the output value of the integral element.

The determination processing may be regarded as the processing in S12 to S22 in FIG. 3 and FIG. 4. Note that the above embodiment may be changed as follows.

The steering angle feedback processing section M22 is not limited to the steering angle feedback processing section that computes the feedback torque Trqr1* from the sum of the output values of the proportional element, the integral element, and the derivative element, which are obtained by using, as the input, the value obtained by subtracting the steering angle θh from the steering angle command value θh*. For example, the steering angle feedback processing section M22 may compute the feedback torque Trqr1* from the sum of the output values of the proportional element and the derivative element, which are obtained by using, as the input, the value obtained by subtracting the steering angle θh from the steering angle command value θh*.

In the steering angle command value computation processing section M20, instead of setting the steering angle command value θh* with the use of the model equation expressed by the above equation (c1), a model equation that is expressed by the following equation (c2) may be used.

$$\Delta = K \cdot \theta h^* + C \cdot \theta h^{*\prime} + J \cdot \theta h^{*\prime\prime} \quad (c2)$$

Here, a spring coefficient K models an influence of the vehicle and is determined by specifications of a suspension, wheel alignment, and the like. In addition, for example, in the case where a turning angle command value computation processing section is provided, the steering angle command value computation processing section M20 and the like may not be provided, and the steering angle command value θh* may be set to a value obtained by subtracting the target operation angle θa* from the turning angle command value θp1*.

For example, the turning angle command value computation processing section that computes the turning angle command value θp1* on the basis of the output value of the deviation computation processing section M12 by executing processing similar to the processing executed by the steering angle command value computation processing section M20 may be provided.

The turning angle feedback processing section is not limited to the turning angle feedback processing section that computes the manipulative variable (the turning-side torque command value Trqt*) for the turning-side actuator 40 from the sum of the output values of the proportional element, the integral element, and the derivative element, which are obtained by using, as the input, the value obtained by subtracting the turning angle θp from the turning angle command value θp*. For example, the turning angle feedback processing section may compute the manipulative variable for the turning-side actuator 40 from the sum of the output values of the proportional element and the derivative element, which are obtained by subtracting the turning angle θp from the turning angle command value θp*.

The controlled variable may not be the turning angle. For example, the controlled variable may be a turning angle rate. In this case, in a control unit, the proportional element and the integral element of the turning angle feedback processing section M36 may not be provided in FIG. 2, for example. Note that, in this case, it may be determined whether the steering system is in the high load state where the turning angle θp does not conform to the steering angle θh in the processing of S12a in FIG. 5.

In the processing that is executed when the clutch 14 is in the disengaged state, the processing by the steering angle ratio variable processing section M28 and the processing by the derivative steering processing section M32 may not be executed. With regard to the determination as to whether the absolute value of the difference between the controlled variable and the command value continues to be equal to or larger than the threshold, for example, in the case where an absolute value of the changing rate of the turning angle θp continues to be equal to or smaller than a specified value (close to zero) in spite of a fact that an absolute value of the q-axis current flowing through the turning-side motor 56 is equal to or larger than a specified value, it may be determined that the absolute value of the difference between the turning angle θp and the turning angle command value θp* continues to be equal to or larger than the threshold. In addition, the q-axis current may be used as a command value in this processing. Alternatively, for example, the turning-side torque command value Trqt* may be used instead of the q-axis current.

In the above embodiment, during the assist processing, the processing on the integral element of the turning angle feedback processing section M36 shown in FIG. 2 is not executed. However, the disclosure is not limited to this configuration. For example, in the processing in FIG. 3 and FIG. 5, instead of setting the turning-side torque command value Trqt* to zero, the integral element of the turning angle feedback processing section M36 may be initialized, and the turning angle θp, which is output by the measure unit setting processing section M4 each time, may be continuously assigned to the turning angle command value θp*, which is input to the turning angle feedback processing section M36.

With regard to the control of the assist torque, when the clutch 14 is in the engaged state, the processing in FIG. 2 may be executed while the turning-side torque command value Trqt* is set to zero. In this case, the reaction force command value Trqr* can correspond to the assist torque Trqa*, and thus the torque of the steering-side motor 26 can correspond to the assist torque Trqa*.

When the clutch 14 is in the engaged state, the reaction force command value Trqr* may be set to zero, and the assist torque may be generated by only the turning-side motor 56. This can be realized by setting α=0 in the processing in FIG. 4, for example. Alternatively, for example, the turning-side torque command value Trqt* may be set by the processing in FIG. 2 while the reaction force command value Trqr* is set to zero. This may be realized, for example, by setting the steering correction amount θd to zero, stopping the processing executed by the steering angle ratio variable processing section M28, stopping the processing for making the steering angle ratio variable, and setting the target operation angle θa* to a value obtained by subtracting the steering angle θh from the turning angle θp at the time point at which the clutch 14 is engaged. However, in this case, the value of the integral element of the turning angle feedback processing section M36 is initialized at the time point at which the state of the clutch 14 is switched to the engaged state.

Note that the assist processing may not be executed when the clutch 14 is in the engaged state. That is, for example, in the case where a structure is employed to make the change amount of the turning angle θp extremely small with respect to the change amount of the steering angle θh at the time when the clutch 14 is in the engaged state, the steered wheels 30 can be turned by the steering torque Trqs that is input to the steering wheel 12, even in the high load state.

The turning-side motor 56 in the turning-side actuator 40 is not limited to the SPMSM. An interior permanent magnet synchronous motor (an IPMSM) may be used as the turning-side motor 56. Furthermore, the turning-side motor 56 is not limited to the synchronous motor, and may be an induction machine, for example. In addition, the turning mechanism provided in the actuator is not limited to the rack-and-pinion mechanism. For example, a rack-cross mechanism, a rack-coaxial mechanism, and a so-called rack-parallel mechanism in which the rack shaft 46 and the rotational shaft 56a are arranged in parallel may be employed.

The steering control device is not limited to the steering control device that includes the CPU 62 and the memory 64, and executes the software processing. For example, the steering control device may include a dedicated hardware circuit (for example, an application specific integrated circuit (ASIC) or the like) that executes hardware processing on at least some of the processing targets subjected to the software processing in the above embodiments. That is, the steering control device may have any of the following configurations (a) to (c). (a) A processor that executes all of the above processing in accordance with the programs, and a memory that stores the programs are provided. (b) A processor that executes some of the above processing in accordance with the programs, a memory that stores the programs, and a dedicated hardware circuit that executes the rest of the processing are provided. (c) A dedicated hardware circuit that executes all of the above processing is provided.

The steering-side motor 26 is not limited to the SPMSM. For example, the IPMSM may be used as the steering-side motor 26. Furthermore, the steering-side motor 26 is not limited to the synchronous motor, and may be the induction machine, for example.

Figure 6:
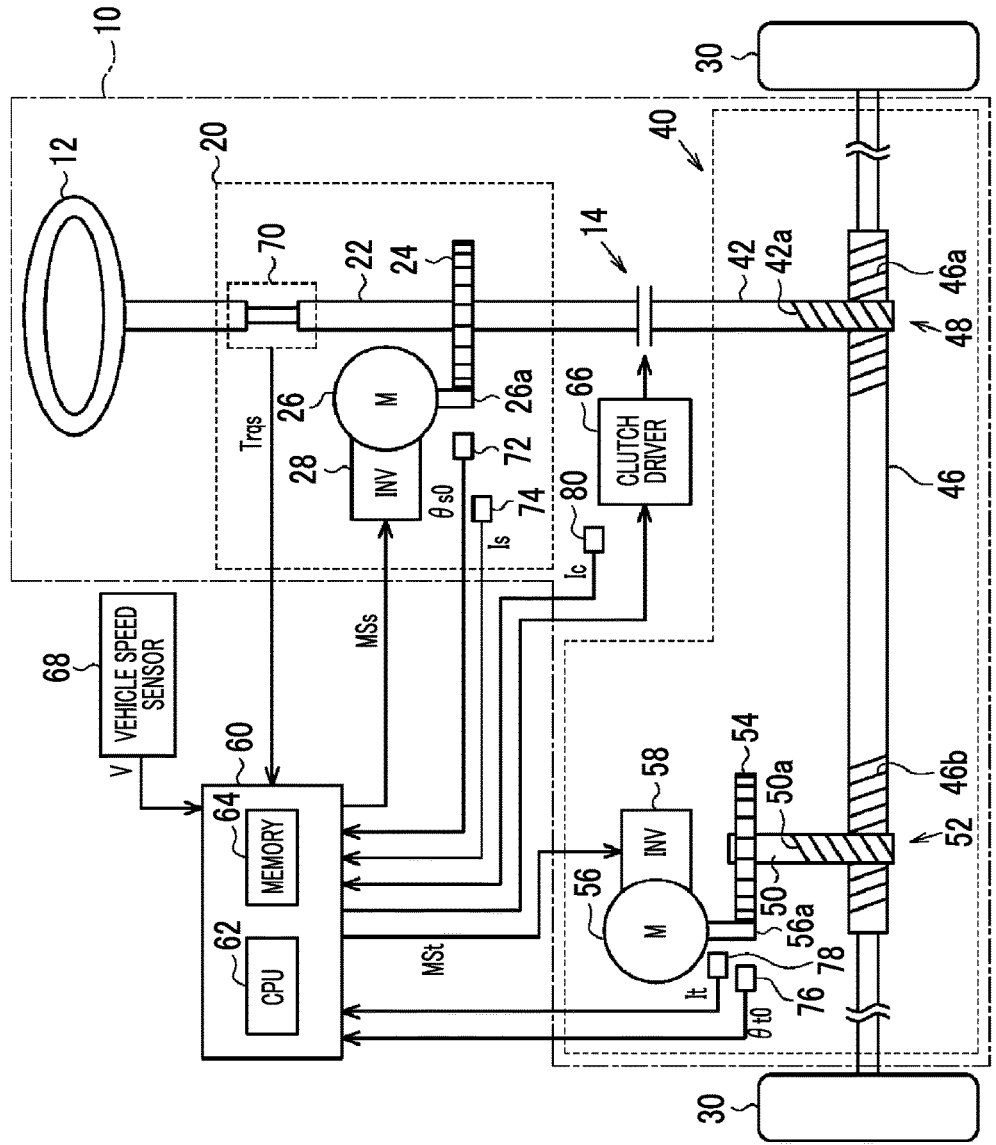
FIG. 6 is a view of a steering control device according to a fourth embodiment and a control target thereof.

A steering control device according to a fourth embodiment will be described with reference to the drawings. As shown in FIG. 6, in a steering system 10 according to this embodiment, a steering wheel 12 is connected to a steering-side actuator 20 that applies a reaction force as a force resisting against an operation of the steering wheel 12. The steering-side actuator 20 includes a steering shaft 22 that is fixed to the steering wheel 12, a steering-side speed reducer 24, a steering-side motor 26 having a rotational shaft 26a connected to the steering-side speed reducer 24, and an inverter 28 that drives the steering-side motor 26. Note that, in this embodiment, the steering-side motor 26 is assumed to be a surface permanent magnet synchronous motor (the SPMSM).

The steering shaft 22 can be connected to a pinion shaft 42 of a turning-side actuator 40 via a normally-closed type clutch 14. The turning-side actuator 40 includes a first rack-and-pinion mechanism 48, a second rack-and-pinion mechanism 52, a turning-side speed reducer 54, a turning-side motor 56 having a rotational shaft 56a connected to the turning-side speed reducer 54, and an inverter 58 that drives the turning-side motor 56. Note that, in this embodiment, the turning-side motor 56 is assumed to be the SPMSM.

The first rack-and-pinion mechanism 48 includes a rack shaft 46 and the pinion shaft 42 that are arranged at a specified crossing angle, and first rack teeth 46a formed on the rack shaft 46 mesh with pinion teeth 42a formed on the pinion shaft 42. Note that steered wheels 30 are respectively connected to both ends of the rack shaft 46 via tie rods.

The second rack-and-pinion mechanism 52 includes the rack shaft 46 and a pinion shaft 50 that are arranged at a specified crossing angle, and second rack teeth 46b formed on the rack shaft 46 mesh with pinion teeth 50a formed on the pinion shaft 50.

The pinion shaft 50 is connected to the rotational shaft 56a of the turning-side motor 56 via the turning-side speed reducer 54. The inverter 58 is connected to the turning-side motor 56. A control device 60 executes control of turning the steered wheels 30 in accordance with the operation of the steering wheel 12 by controlling the steering system 10 that includes the steering-side actuator 20 and the turning-side actuator 40. That is, in this embodiment, a steer-by-wire system is realized by the steering-side actuator 20 and the turning-side actuator 40, and the control device 60 normally executes the control of turning the steered wheels 30 in accordance with the operation of the steering wheel 12 while maintaining the clutch 14 in a disengaged state. At this time, the control device 60 acquires an output value of a torque sensor 70 that detects torque (steering torque Trqs) applied to the steering shaft 22, an output value of a steering-side angle sensor 72 that detects a rotation angle θs0 of the rotational shaft 26a of the steering-side motor 26, and an output value of a steering-side current sensor 74 that detects a current Is flowing through the steering-side motor 26. The control device 60 also acquires an output value of a turning-side angle sensor 76 that detects a rotation angle θt0 of the rotational shaft 56a, an output value of a turning-side current sensor 78 that detects a current It flowing through the turning-side motor 56, an output value of a clutch current sensor 80 that detects a current Ic flowing through a clutch driver 66 that drives the clutch 14, and an output value of a vehicle speed sensor 68 that detects a vehicle speed V.

Figure 7:
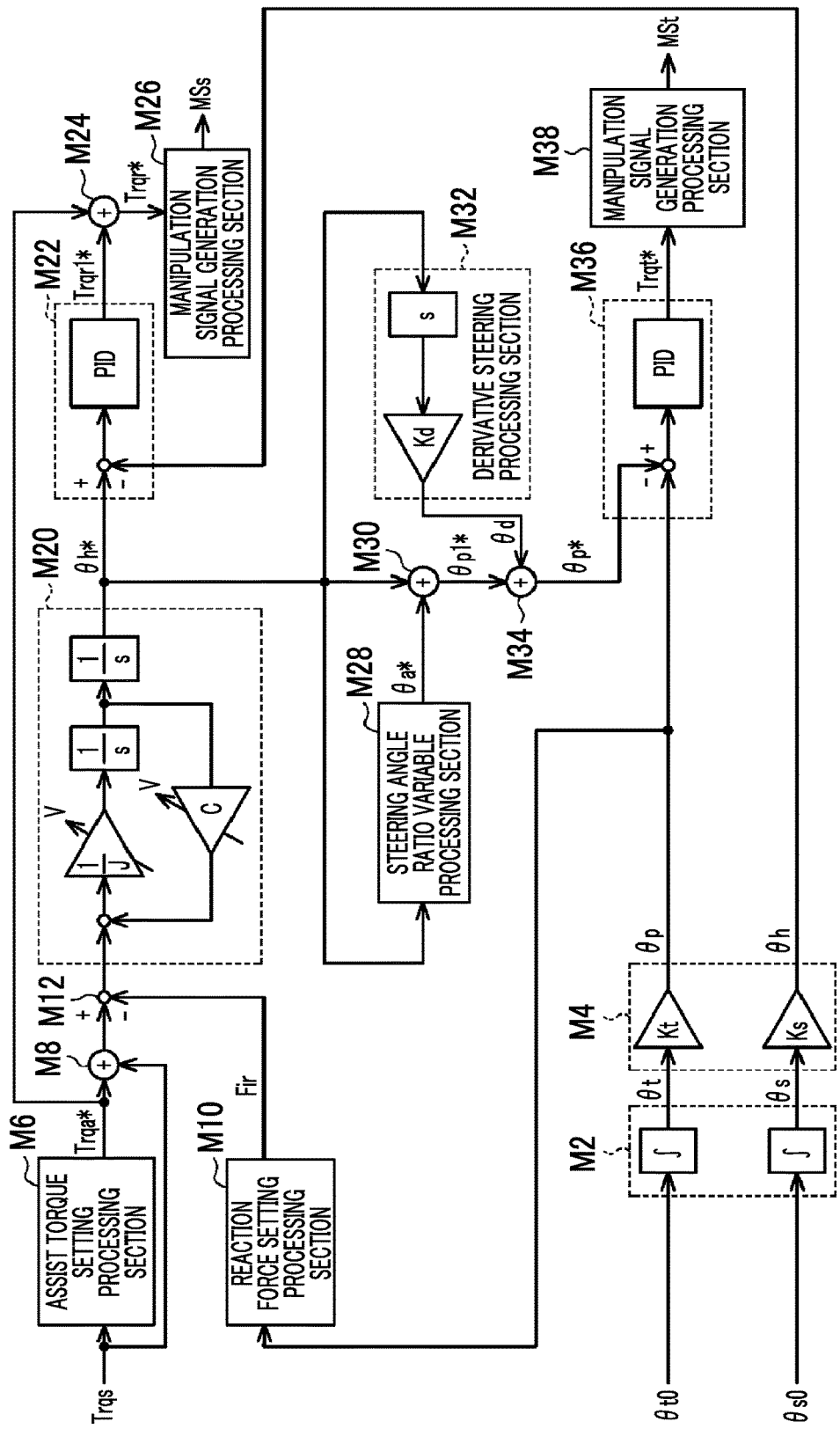
FIG. 7 is a block diagram according to the embodiment.

The control device 60 includes a central processing unit (CPU) 62 and a memory 64 and executes various kinds of processing when the CPU 62 executes programs stored in the memory 64. FIG. 7 shows part of the processing executed at least when the clutch 14 is in the disengaged state among the various kinds of processing realized when the CPU 62 executes the programs stored in the memory 64.

An integration processing section M2 converts the rotation angle θs0, which is detected by the steering-side angle sensor 72, and the rotation angle θt0, which is detected by the turning-side angle sensor 76, to numerical values that fall within an angle range wider than an angle range of 0 to 360° and sets the numerical values as rotation angles θs, θt. That is, for example, when the steering wheel 12 is turned from a neutral position, at which a vehicle travels straight, to a maximum position on a right side or a left side, the rotational shaft 26a rotates by an angle exceeding 360°. Accordingly, for example, when the rotational shaft 26a makes two turns in a specified direction from a state where the steering wheel 12 is at the neutral position, the integration processing section M2 outputs a value of 720°. Note that, at the neutral position, the output value of the integration processing section M2 is zero.

A measure unit setting processing section M4 multiplies the output value of the steering-side angle sensor 72, which has been processed by the integration processing section M2, by a conversion coefficient Ks to compute a steering angle θh, and multiplies the output value of the turning-side angle sensor 76, which has been processed by the integration processing section M2, by a conversion coefficient Kt to compute a turning angle θp. Here, the conversion coefficient Ks is set in accordance with a rotational speed ratio between the steering-side speed reducer 24 and the rotational shaft 26a of the steering-side motor 26, and thus, a change amount of the rotation angle θs of the rotational shaft 26a is converted to a rotation amount of the steering wheel 12. Thus, the steering angle θh is a rotation angle of the steering wheel 12 with respect to the neutral position. In addition, the conversion coefficient Kt is a product of a rotational speed ratio between the turning-side speed reducer 54 and the rotational shaft 56a of the turning-side motor 56 and a rotational speed ratio between the pinion shaft 50 and the pinion shaft 42. In this way, a rotation amount of the rotational shaft 56a is converted to the rotation amount of the steering wheel 12 on the assumption that the clutch 14 is engaged.

Note that, in the processing shown in FIG. 7, each of the rotation angles θs, θt, the steering angle θh, and the turning angle θp is a positive value when the angle is a rotation angle in the specified direction, and is a negative value when the angle is a rotation angle in an opposite direction. That is, for example, when the rotational shaft 26a rotates in the direction opposite to the specified direction from the state where the steering wheel 12 is at the neutral position, the integration processing section M2 outputs the negative value. However, this is merely one example of logic of a control system. In particular, in this specification, a state where each of the rotation angles θs, θt, the steering angle θh, and the turning angle θp is large signifies that the rotation amount from the neutral position is large, that is, each parameter that can have either the positive value or the negative value as described above has a large absolute value.

An assist torque setting processing section M6 sets assist torque Trqa* on the basis of the steering torque Trqs. The assist torque Trqa* is set to be a larger value as the steering torque Trqs is increased. An addition processing section M8 adds the steering torque Trqs to the assist torque Trqa* and outputs an added value.

A reaction force setting processing section M10 sets a reaction force Fir that is a force resisting against the rotation of the steering wheel 12. In detail, in this embodiment, the reaction force setting processing section M10 receives the turning angle θp and sets a magnitude of the reaction force Fir to a large value when a magnitude of the turning angle θp is large as compared to a case where the magnitude of the turning angle θp is small.

A deviation computation processing section M12 outputs a value that is obtained by subtracting the reaction force Fir from the output of the addition processing section M8. A steering angle command value computation processing section M20 sets a steering angle command value θh* on the basis of the output value of the deviation computation processing section M12. Here, a model equation expressed by the following equation (c1) that correlates an output value Δ of the deviation computation processing section M12 with the steering angle command value θh* is used.

$$\Delta = C \cdot \theta h^{*\prime} + J \cdot \theta h^{*\prime\prime} \quad (c1)$$

A model that is expressed by the above equation (c1) is a model that defines a relationship between an axial force of the rack shaft 46 and the steering angle θh in the steering system 10 in which the steering wheel 12 is mechanically connected to the steered wheels 30. In the above equation (c1), a viscosity coefficient C models friction or the like of the steering system 10, and an inertia coefficient J models inertia of the steering system 10. Here, the viscosity coefficient C and the inertia coefficient J are variably set in accordance with the vehicle speed V.

A steering angle feedback processing section M22 sets feedback torque Trqr1* as a manipulative variable that is used for controlling the steering angle θh to the steering angle command value θh* through feedback. More specifically, a sum of output values of a proportional element, an integral element, and a derivative element is set as the feedback torque Trqr1*, the output values of the proportional element, the integral element, and the derivative element being obtained by using, as an input, a value obtained by subtracting the steering angle θh from the steering angle command value θh*.

An addition processing section M24 outputs a sum of the feedback torque Trqr1* that is output by the steering angle feedback processing section M22, and the assist torque Trqa* that is output by the assist torque setting processing section M6, as a torque command value (a reaction force command value (a steering-side torque command value) Trqr*) for the steering-side motor 26.

A manipulation signal generation processing section M26 generates a manipulation signal MSs for the inverter 28 on the basis of the steering-side torque command value Trqr* and outputs the manipulation signal MSs to the inverter 28. This can be realized, for example, by known current feedback control in which a command value of a q-axis current is set on the basis of the steering-side torque command value Trqr* and d,q-axes voltage command values are set as manipulative variables used for controlling d, q-axes currents to the command values through feedback. Note that the d-axis current may be controlled to zero; however, when a rotational speed of the steering-side motor 26 is high, an absolute value of the d-axis current may be set to a larger value than zero, and weak field control may be executed. The absolute value of the d-axis current can be set to a larger value than zero in a low rotational speed region.

A steering angle ratio variable processing section M28 sets a target operation angle θa* on the basis of the steering angle command value θh*, the target operation angle θa* being used to variably set a steering angle ratio as a ratio between the steering angle θh and the turning angle θp. An addition processing section M30 computes a turning angle command value θp1* by adding the target operation angle θa* to the steering angle command value θh*.

A derivative steering processing section M32 outputs a value, which is obtained by multiplying a changing rate of the steering angle command value θh* by a gain Kd, as a steering correction amount θd. A steering correction processing section M34 computes a turning angle command value θp* by adding the steering correction amount θd to the turning angle command value θp1* and outputs the turning angle command value θp*.

A turning angle feedback processing section M36 sets a torque command value (a turning-side torque command value Trqt*) for the turning-side motor 56, as the manipulative variable for controlling the turning angle θp to the turning angle command value θp* through feedback. More specifically, the sum of the output values of the proportional element, the integral element, and the derivative element is set as the turning-side torque command value Trqt*, the output values of the proportional element, the integral element, and the derivative element being obtained by using, as an input, a value obtained by subtracting the turning angle θp from the turning angle command value θp*.

A manipulation signal generation processing section M38 generates a manipulation signal MSt for the inverter 58 on the basis of the turning-side torque command value Trqt* and outputs the manipulation signal MSt to the inverter 58. This can be performed in a manner similar to the manipulation signal generation processing performed by the manipulation signal generation processing section M26.

According to the above processing, in the disengaged state of the clutch 14, that is, in a state where power transmission from the steering wheel 12 to the steered wheels 30 is cut off, the steered wheels 30 can be turned in accordance with the operation of the steering wheel 12. In this embodiment, basically, the processing of turning the steered wheels 30 in accordance with the operation of the steering wheel 12 in the disengaged state of the clutch 14 is executed by using the processing shown in FIG. 7. However, processing of turning the steered wheels 30 in an engaged state of the clutch 14 is executed under a specified condition. Next, this processing will be described.

Figure 8:
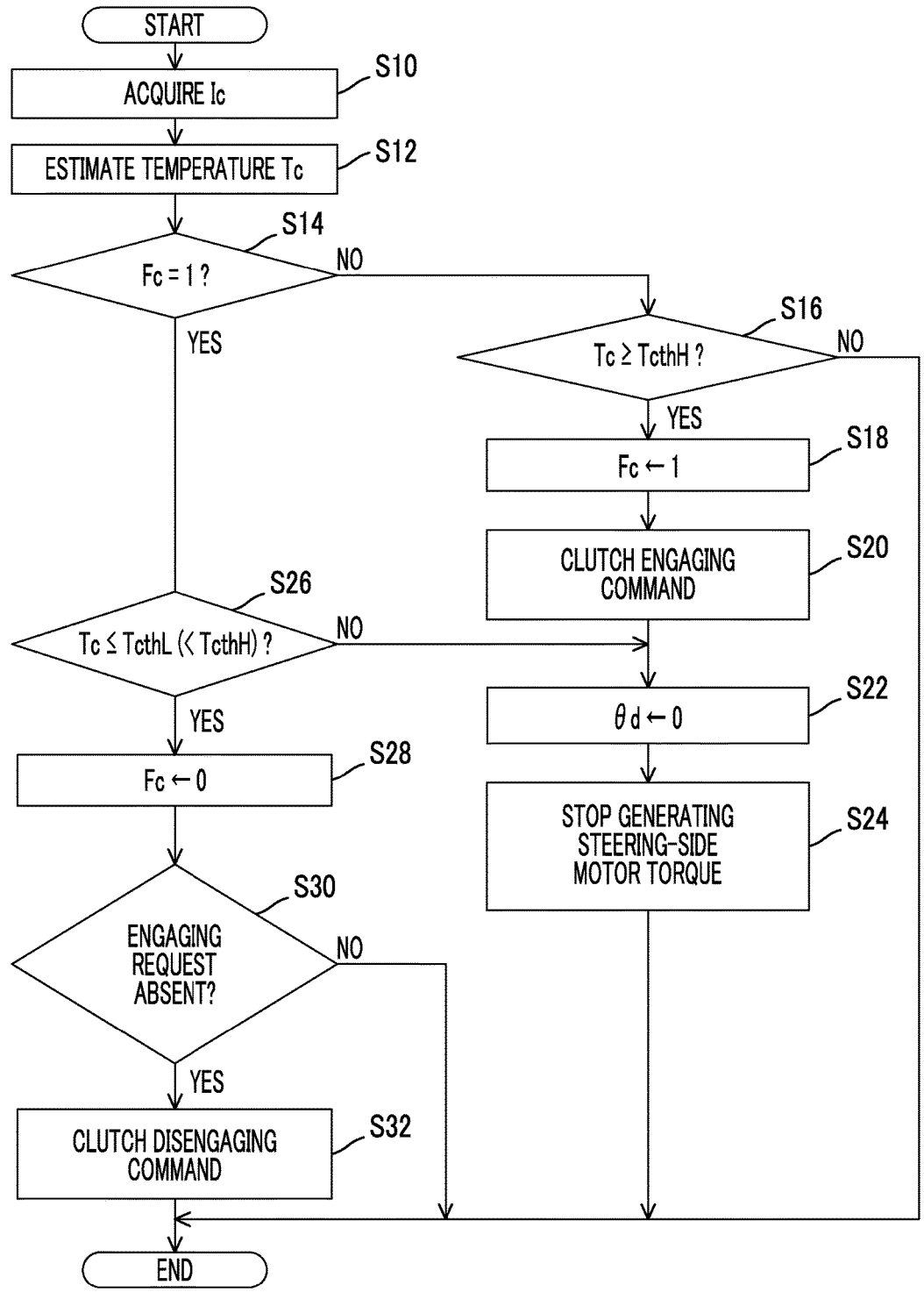
FIG. 8 is a flowchart showing a procedure of overheat suppression processing for a clutch according to the embodiment.

FIG. 8 shows a procedure of processing for engaging and disengaging the clutch 14 based on a temperature of the clutch driver 66. The processing shown in FIG. 8 is realized when the CPU 62 repeatedly executes the program stored in the memory 64 in specified cycles. Note that, in the following description, step numbers will be described by numbers with "S" disposed ahead of the numbers.

In a series of the processing shown in FIG. 8, the CPU 62 first acquires a current Ic that is detected by the clutch current sensor 80 (S10). Then, based on the current Ic, the CPU 62 estimates a temperature Tc of the clutch driver 66 (S12). More specifically, when the current Ic is equal to or larger than a specified value, the CPU 62 performs correction to increase the temperature Tc by a specified amount. When the current Ic is smaller than the specified value and is equal to or larger than a prescribed value, the CPU 62 does not correct the temperature Tc. When the current Ic is smaller than the prescribed value, the CPU 62 performs correction to decrease the temperature Tc by a prescribed amount. Through the processing, the CPU 62 estimates the temperature Tc. Here, an upper limit value and a lower limit value of the temperature Tc are set. The increasing correction is performed within a range equal to or lower than the upper limit value, and the decreasing correction is performed within a range equal to or higher than the lower limit value.

Next, the CPU 62 determines whether a clutch overheat flag Fc is "1" (S14). When the clutch overheat flag Fc is "1", the clutch overheat flag Fc indicates that a request for bringing the clutch 14 into the engaged state is made due to the extremely high temperature Tc. When the clutch overheat flag Fc is "0", the clutch overheat flag Fc indicates that the request is not made. When determining that the clutch overheat flag Fc is "0" (S14: NO), the CPU 62 determines whether the temperature Tc is equal to or higher than a specified temperature TcthH (S16). This processing is executed to determine whether the clutch driver 66 is in an abnormal state in which the temperature Tc of the clutch driver 66 is extremely high. Then, when determining that the temperature Tc is equal to or higher than the specified temperature TcthH (S16: YES), the CPU 62 sets the clutch overheat flag Fc to "1" (S18). Then, the CPU 62 outputs a clutch engaging command for the clutch 14 (i.e., a command for engaging the clutch 14) (S20). More specifically, in this processing, the CPU 62 outputs a command for stopping energizing the clutch driver 66.

Then, when the clutch 14 is brought into the engaged state, the CPU 62 fixes the steering correction amount θd to zero (S22). Next, the CPU 62 executes processing to stop driving the steering-side motor 26 (S24). Here, for example, the CPU 62 may execute processing to set the steering-side torque command value Trqr* to zero. However, the processing is not limited thereto. For example, a relay may be provided between the steering-side motor 26 and the inverter 28, and the relay may be brought into an opened state.

When determining that the clutch overheat flag Fc is "1" (S14: YES), the CPU 62 determines whether the temperature Tc is equal to or lower than a prescribed temperature TcthL that is lower than the above-described specified temperature TcthH (S26). Then, when the CPU 62 determines that the temperature Tc is higher than the prescribed temperature TcthL (S26: NO), the processing proceeds to step S22. When determining that the temperature Tc is equal to or lower than the prescribed temperature TcthL (S26: YES), the CPU 62 sets the clutch overheat flag Fc to "0" (S28). Then, the CPU 62 determines whether an engaging request for the clutch 14 (i.e., a request for engaging the clutch 14) is absent (S30). Here, when a turning-side overheat flag Ft (described below) is "1", or when a steering-side overheat flag Fs (described below) is "1", it is determined that the engaging request is present.

Then, when determining that the engaging request is absent (S30: YES), the CPU 62 outputs a clutch disengaging command for the clutch 14 (i.e., a command for disengaging the clutch 14) (S32). More specifically, the CPU 62 outputs a command to start energizing the clutch driver 66. In this way, the clutch 14 is brought into the disengaged state.

Note that, when the processing in S24 or S32 is completed, or when a negative determination is made in S16 or S30, the CPU 62 ends the series of the processing shown in FIG. 8. When the clutch overheat flag Fc is set to "0" by the processing in S28, the processing in S22 and S24 is ended. Thus, for example, the processing of generating the torque of the steering-side motor 26 is restarted.

Figure 9:
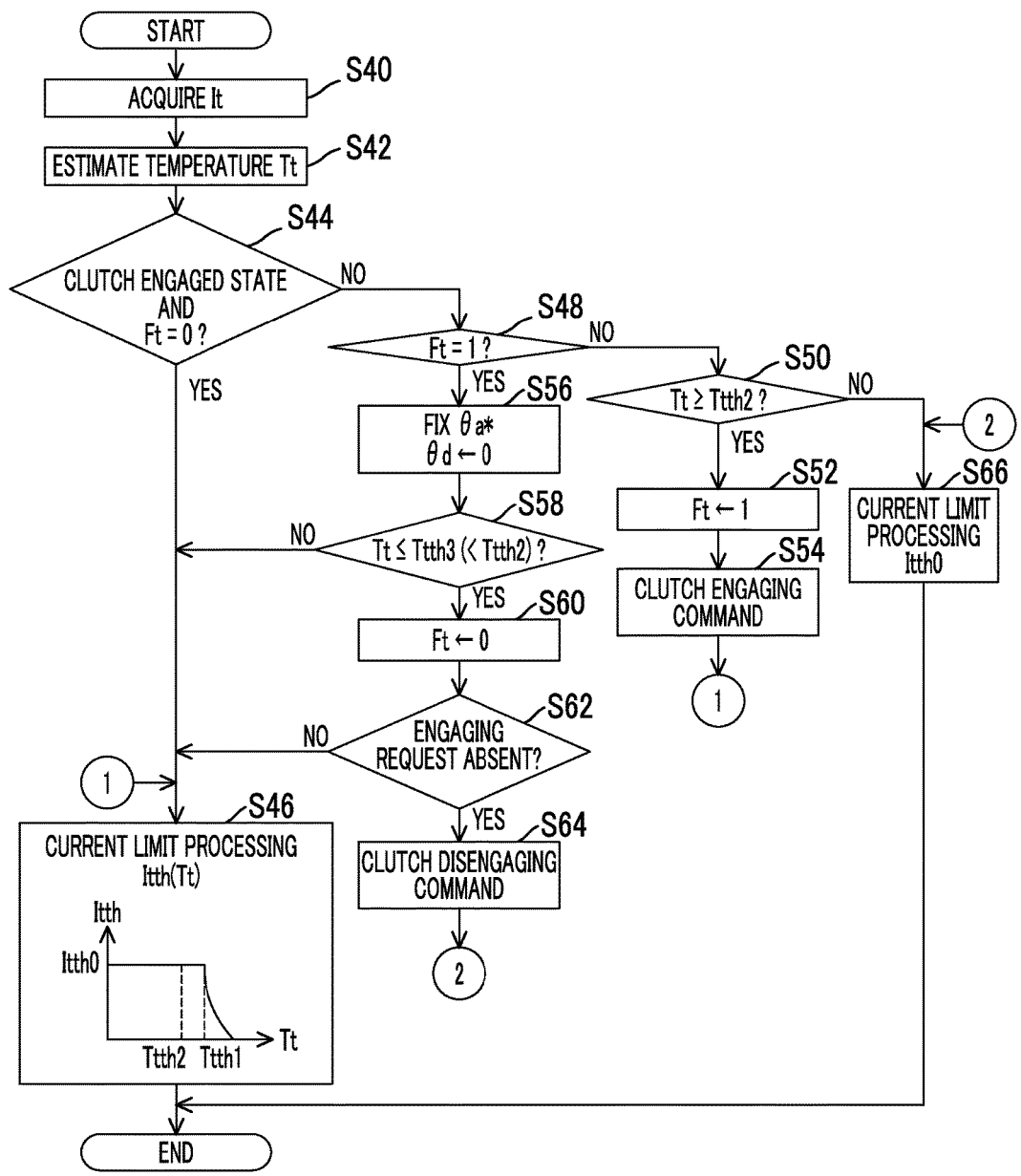
FIG. 9 is a flowchart showing a procedure of overheat suppression processing for a turning-side actuator according to the embodiment.

FIG. 9 shows a procedure of processing for engaging and disengaging the clutch 14 on the basis of a temperature of the turning-side actuator 40. The processing shown in FIG. 9 is realized when the CPU 62 repeatedly executes the program stored in the memory 64 in specified cycles.

In a series of the processing shown in FIG. 9, the CPU 62 first acquires the current It that is detected by the turning-side current sensor 78 (S40). Note that the current It is actually an amplitude of the current flowing through the turning-side motor 56, a value obtained by multiplying the amplitude by a specified factor, or the like. For example, the current It can be computed on the basis of a detected value of the turning-side current sensor 78. Then, based on the current It, the CPU 62 estimates a temperature Tt of the turning-side actuator 40 (S42). This processing is similar to the processing in S12.

Next, the CPU 62 determines whether logical conjunction of a fact that the clutch 14 is in the engaged state and a fact that the turning-side overheat flag Ft is "0" is true (S44). Here, when the turning-side overheat flag Ft is "1", the turning-side overheat flag Ft indicates that a request for bringing the clutch 14 into the engaged state is made due to the high temperature of the turning-side actuator 40. When the turning-side overheat flag Ft is "0", the turning-side overheat flag Ft indicates that the request is not made. Then, when determining that the logical conjunction is true (S44: YES), the CPU 62 executes processing to limit the current It flowing through the turning-side actuator 40 to an upper limit value Itth (S46). This processing is executed to limit a command value of the current flowing through the turning-side motor 56 to a value equal to or smaller than the upper limit value Itth at a time when the value is computed so as to compute the manipulation signal MSt in accordance with the turning-side torque command value Trqt*. Here, in this embodiment, when the temperature Tt is lower than a first threshold temperature Ttth1, the upper limit value Itth is set to a maximum value Itth0. When the temperature Tt is equal to or higher than the first threshold temperature Ttth1, the upper limit value Itth is set to a lower value as the temperature Tt is increased.

When determining that the logical conjunction is false (S44: NO), the CPU 62 determines whether the turning-side overheat flag Ft is "1" (S48). Then, when determining that the turning-side overheat flag Ft is "0" (S48: NO), the CPU 62 determines whether the temperature Tt is equal to or higher than a second threshold temperature Ttth2 that is lower than the first threshold temperature Ttth1 (S50). Then, when determining that the temperature Tt is equal to or higher than the second threshold temperature Ttth2 (S50: YES), the CPU 62 sets the turning-side overheat flag Ft to "1" (S52). Then, the CPU 62 outputs the clutch engaging command for the clutch 14 (i.e., the command for engaging the clutch 14) (S54), and the processing proceeds to the processing in S46.

When determining that the turning-side overheat flag Ft is "1" (S48: YES), the CPU 62 fixes the target operation angle θa* and fixes the steering correction amount θd to zero (S56). That is, the CPU 62 stops the processing of variably setting the steering angle ratio executed by the steering angle ratio variable processing section M28, and stops the processing executed by the derivative steering processing section M32. Here, the processing of fixing the target operation angle θa* may be processing of assigning, to the target operation angle θa*, the value obtained by subtracting the steering angle θh from the turning angle θp at a time point at which the clutch 14 is switched from the disengaged state to the engaged state, for example. Next, the CPU 62 determines whether the temperature Tt is equal to or lower than a third threshold temperature Ttth3 that is lower than the second threshold temperature Ttth2 (S58). This processing is processing for determining whether an overheated state of the turning-side actuator 40 is eliminated. Then, when the CPU 62 determines that the temperature Tt is higher than the third threshold temperature Ttth3 (S58: NO), the processing proceeds to the processing in S46. When determining that the temperature Tt is equal to or lower than the third threshold temperature Ttth3 (S58: YES), the CPU 62 sets the turning-side overheat flag Ft to "0" (S60). Then, the CPU 62 determines whether the engaging request for the clutch 14 is absent (S62). Here, when the clutch overheat flag Fc is "1", or when the steering-side overheat flag Fs, which will be described below, is "1", it is determined that the engaging request is present.

When the CPU 62 determines that the engaging request is present (S62: NO), the processing proceeds to the processing in S46. When determining that the engaging request is absent (S62: YES), the CPU 62 outputs the clutch disengaging command for the clutch 14 (i.e., the command for disengaging the clutch 14) (S64).

When the CPU 62 determines that the temperature Tt is lower than the second threshold temperature Ttth2 (S50: NO), or when the processing in S64 is completed, the CPU 62 executes processing of limiting the current It by setting the maximum value Itth0 to the upper limit value Itth (S66).

Figure 10:
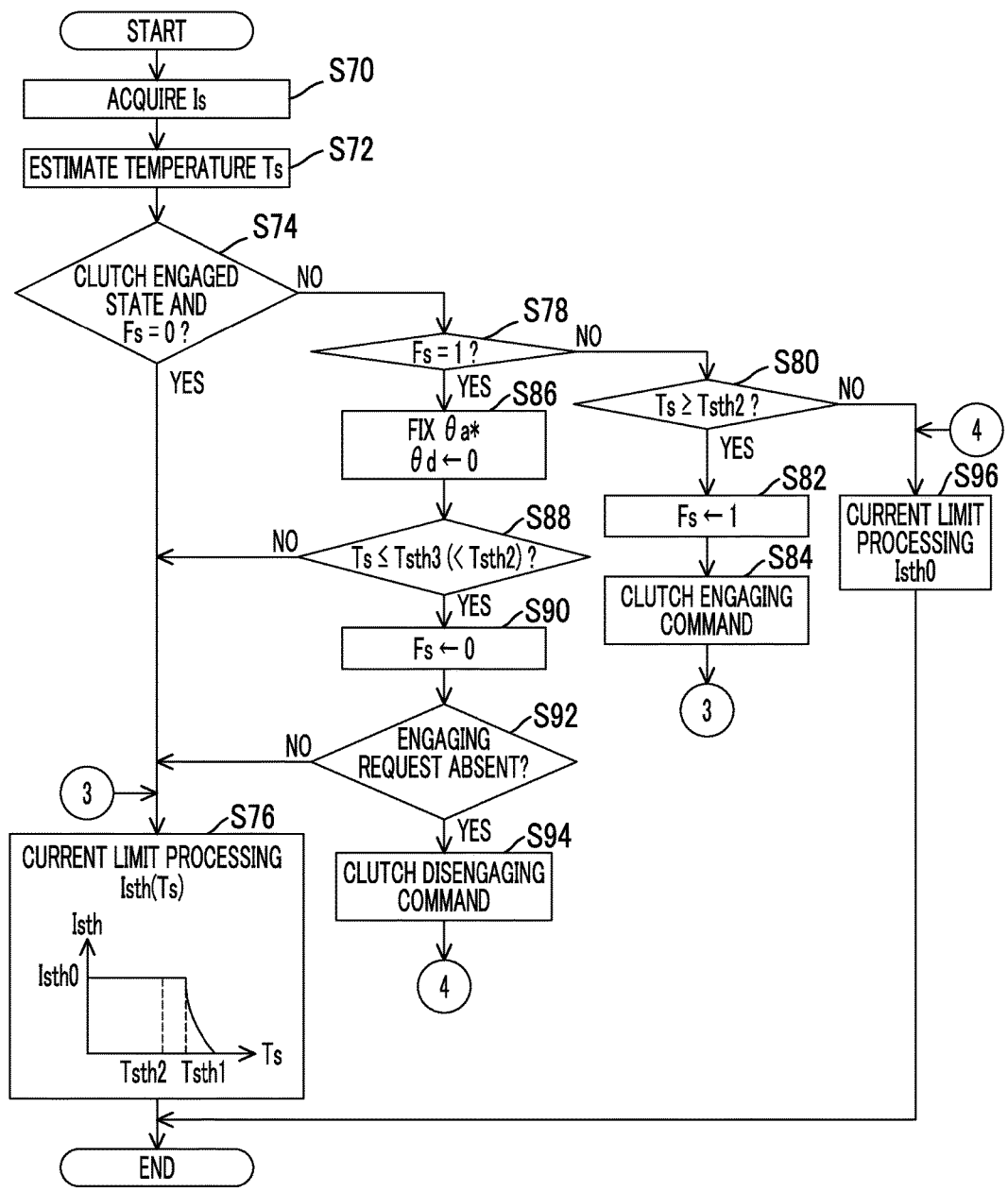
FIG. 10 is a flowchart showing a procedure of overheat suppression processing for a steering-side actuator according to the embodiment.

When the processing in S46 or S66 is completed, the CPU 62 ends the series of the processing shown in FIG. 9. FIG. 10 shows a procedure of processing for engaging and disengaging the clutch 14 on the basis of a temperature of the steering-side actuator 20. The processing shown in FIG. 10 is realized when the CPU 62 repeatedly executes the program stored in the memory 64 in specified cycles.

In a series of the processing shown in FIG. 10, the CPU 62 first acquires the current Is that is detected by the steering-side current sensor 74 (S70). Note that the current Is is actually an amplitude of the current flowing through the steering-side motor 26, a value obtained by multiplying the amplitude by a specified factor, or the like. For example, the current Is can be computed on the basis of a detected value of the steering-side current sensor 74. Then, based on the current Is, the CPU 62 estimates a temperature Ts of the steering-side actuator 20 (S72). This processing is similar to the processing in S12 in FIG. 8.

Next, the CPU 62 determines whether logical conjunction of the fact that the clutch 14 is in the engaged state and a fact that the steering-side overheat flag Fs is "0" is true (S74). Here, when the steering-side overheat flag Fs is "1", the steering-side overheat flag Fs indicates that the request for bringing the clutch 14 into the engaged state is made due to the high temperature of the steering-side actuator 20. When the steering-side overheat flag Fs is "0", the steering-side overheat flag Fs indicates that the request is not made. Then, when determining that the logical conjunction is true (S74: YES), the CPU 62 executes processing of limiting the current Is flowing through the steering-side actuator 20 to an upper limit value Isth (S76). This processing is executed to limit a command value of the current flowing through the steering-side motor 26 to a value equal to or smaller than the upper limit value Isth at a time when the value is computed so as to compute the manipulation signal MSs in accordance with the steering-side torque command value Trqr*. Here, when the temperature Ts is lower than a first threshold temperature Tsth1, the CPU 62 sets the upper limit value Isth to a maximum value Isth0. When the temperature Ts is equal to or higher than the first threshold temperature Tsth1, the CPU 62 sets the upper limit value Isth to a lower value as the temperature Ts is increased.

When determining that the logical conjunction is false (S74: NO), the CPU 62 executes processing in S78 to S96 corresponding to the processing in S48 to S66 in FIG. 9. Note that, in S80, the CPU 62 determines whether the temperature Ts is equal to or higher than a second threshold temperature Tsth2 that is lower than the first threshold temperature Tsth1, and in S88, the CPU 62 determines whether the temperature Ts is equal to or lower than a third threshold temperature Tsth3 that is lower than the second threshold temperature Tsth2. In S82 and S90, the CPU 62 updates a value of the steering-side overheat flag Fs instead of the turning-side overheat flag Ft. In the processing in S96, the CPU 62 executes processing of limiting the current Is to the maximum value Isth0.

Here, effects of this embodiment will be described. The CPU 62 brings the clutch 14 into the disengaged state and executes the processing of turning the steered wheels 30 in accordance with the operation of the steering wheel 12 on the basis of the processing shown in FIG. 7. At this time, when the temperature of the clutch driver 66 is excessively increased, the CPU 62 engages the clutch 14 for overheat protection (S20). Then, the CPU 62 stops generating the torque of the steering-side motor 26 and stops the processing of variably setting the steering angle ratio.

Also, when the temperature Tt of the turning-side actuator 40 is equal to or higher than the second threshold temperature Ttth2, the CPU 62 engages the clutch 14 (S54). Then, when the temperature Tt is lower than the first threshold temperature Ttth1, the CPU 62 limits the current It to the maximum value Itth0. When the temperature Tt is equal to or higher than the first threshold temperature Ttth1, the CPU 62 limits the current It while reducing the upper limit value Itth to a value smaller than the maximum value Itth0. Accordingly, the current It can be increased to the maximum value Itth0 before the clutch 14 is engaged. Thus, as compared to the case where the clutch 14 is engaged when the temperature Tt is equal to or higher than the first threshold temperature Ttth1, even if the required torque of the turning-side motor 56 is large, the required torque can be generated as much as possible. When the clutch 14 is brought into the engaged state, the steering torque Trqs, which is input to the steering wheel 12, is transmitted to the steered wheels 30. Accordingly, even when the torque of the turning-side motor 56 is small, the turning angle θp can be appropriately controlled in accordance with the steering angle θh.

Note that, when the steering torque Trqs, which is input to the steering wheel 12, is transmitted to the steered wheels 30, the required torque of the turning-side motor 56 becomes small for the steering torque Trqs. Thus, as compared to the case where the clutch 14 is not engaged, the temperature Tt is less likely to reach the first threshold temperature Ttth1.

Also, when the temperature Ts of the steering-side actuator 20 is equal to or higher than the second threshold temperature Tsth2, the CPU 62 engages the clutch 14 (S84). Then, when the temperature Ts is lower than the first threshold temperature Tsth1, the current Is is limited to the maximum value Isth0. When the temperature Ts is equal to or higher than the first threshold temperature Tsth1, the current Is is limited while the upper limit value Isth is reduced to be smaller than the maximum value Isth0. Accordingly, the current Is can be increased to the maximum value Isth0 before the clutch 14 is engaged. Thus, as compared to the case where the clutch 14 is engaged when the temperature Ts is equal to or higher than the first threshold temperature Tsth1, even if the required torque of the steering-side motor 26 is large, the required torque can be generated as much as possible. In addition, when the clutch 14 is engaged, the reaction force from each of the steered wheels 30 is transmitted to the steering wheel 12. Thus, even when the torque of the steering-side motor 26 is small, it is possible to suppress occurrence of a situation where the steering wheel 12 is excessively rotated with the small force.

According to this embodiment that has been described so far, the following effect is further obtained. (1) When the clutch 14 is in the engaged state due to the high temperature Tt or the high temperature Ts, the target operation angle θa* is fixed, and the steering correction amount θd is fixed to zero. In this way, the steering-side actuator 20 is controlled such that the steering angle θh becomes equal to the steering angle command value θh*, and the turning-side actuator 40 is controlled such that the turning angle θp becomes equal to the turning angle command value θp*while the change amount of the turning angle command value θp* is equal to the change amount of the steering angle command value θh*. Accordingly, the control of the steering angle θh to the steering angle command value θh* can conform to the control of the turning angle θp to the turning angle command value θp*. Accordingly, it is possible to suppress occurrence of a situation where the control of the steering angle θh to the steering angle command value θh* and the control of the turning angle θp to the turning angle command value θp*interfere with each other.

A fifth embodiment will be described with reference to the drawings, with a focus on differences between the fifth embodiment and the fourth embodiment.

Figure 11:
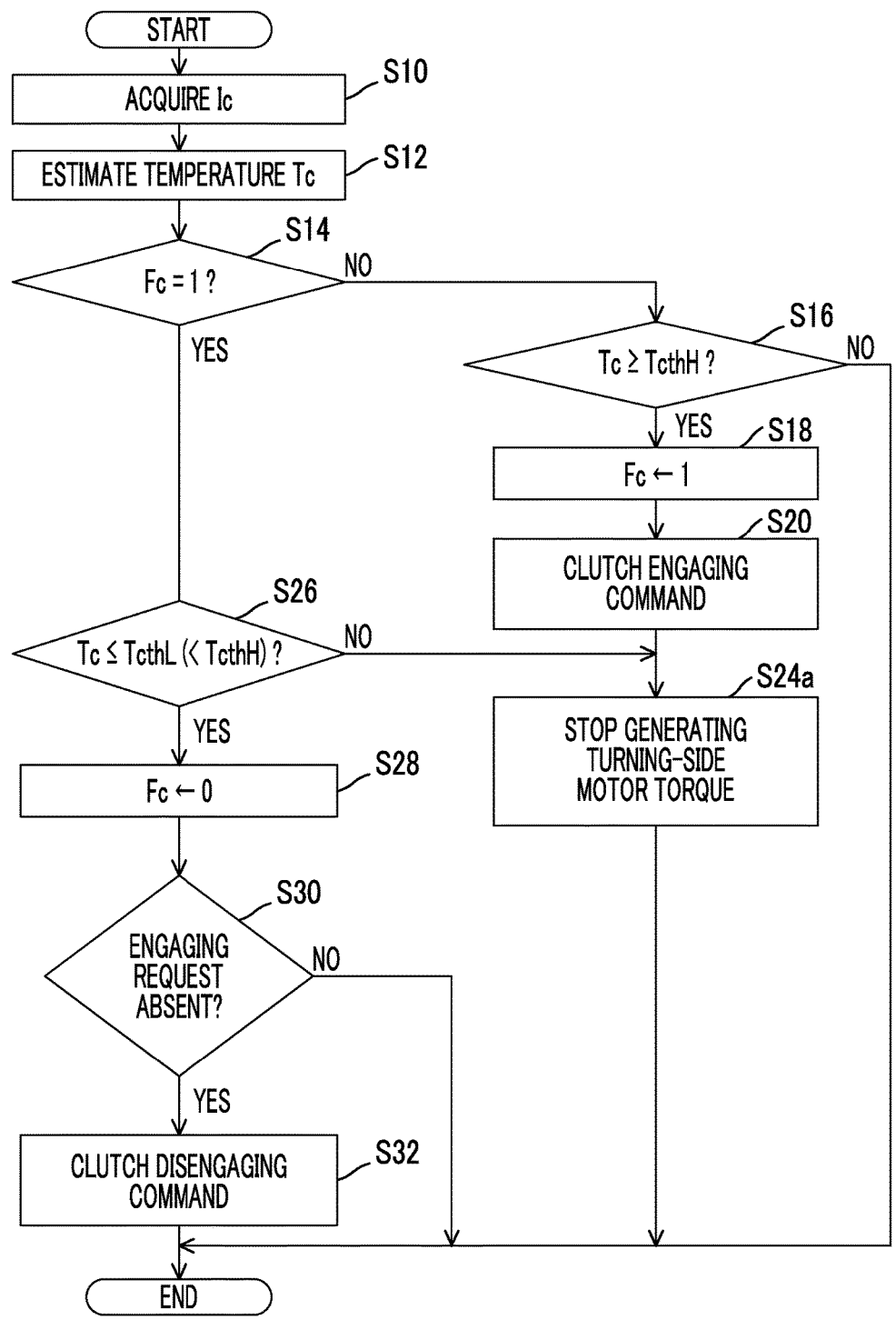
FIG. 11 is a flowchart showing a procedure of overheat suppression processing for a clutch according to a fifth embodiment.

FIG. 11 shows a procedure of processing for engaging and disengaging the clutch 14 based on the temperature of the clutch driver 66. The processing shown in FIG. 11 is realized when the CPU 62 repeatedly executes the program stored in the memory 64 in specified cycles. Here, processing in FIG. 11 corresponding to that shown in FIG. 8 is denoted by the same step number for convenience of the description, and the description thereof will not be made.

In a series of the processing shown in FIG. 11, after outputting the command for engaging the clutch 14 (S20), the CPU 62 executes processing of stopping generating the torque of the turning-side motor 56 (S24a) and ends the series of the processing shown in FIG. 11. Note that the processing in S24a can be executed similarly to the above processing in S24 in FIG. 8.

Figure 12:
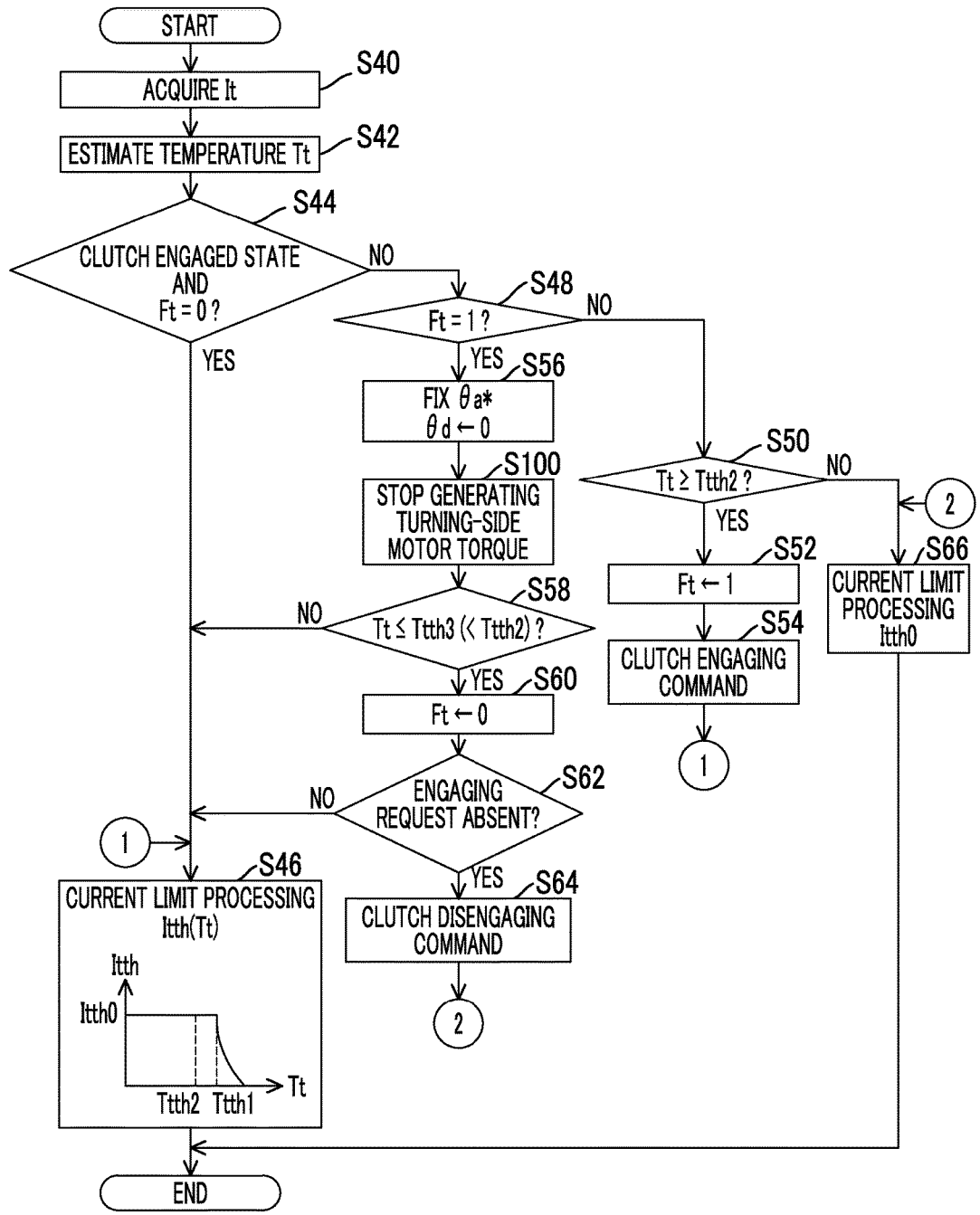
FIG. 12 is a flowchart showing a procedure of overheat suppression processing for a turning-side actuator according to the embodiment.

FIG. 12 shows a procedure of processing for engaging and disengaging the clutch 14 on the basis of the temperature of the turning-side actuator 40. The processing shown in FIG. 12 is realized when the CPU 62 repeatedly executes the program stored in the memory 64 in specified cycles. Here, processing in FIG. 12 corresponding to that shown in FIG. 9 is denoted by the same step number for convenience of the description, and the description thereof will not be made.

In a series of the processing shown in FIG. 12, when the processing in S56 is completed, the CPU 62 stops generating the torque of the turning-side motor 56 (S100). This processing can be realized similarly to the processing in S24 in FIG. 8. Then, when the CPU 62 completes the processing in S100, the processing proceeds to the processing in S58. Note that, when the CPU 62 makes a negative determination in S58, or when the CPU 62 makes a negative determination in S62, the processing proceeds to the processing in S46. However, because the current does not flow through the turning-side motor 56 in this case, guard processing using the upper limit value Itth does not function.

Here, effects of this embodiment will be described. The CPU 62 brings the clutch 14 into the disengaged state and executes the processing of turning the steered wheels 30 in accordance with the operation of the steering wheel 12 on the basis of the processing shown in FIG. 7. At this time, when the temperature of the clutch driver 66 is excessively increased, the CPU 62 engages the clutch 14 for the overheat protection (S20). Then, the CPU 62 stops generating the torque of the turning-side motor 56. In this case, the steering-side torque command value Trqr* is the value close to the assist torque Trqa*, and thus the steering-side motor 26 outputs the torque corresponding to the assist torque Trqa* and thereby assists turning of the steered wheels 30.

Also, when the temperature Tt of the turning-side actuator 40 is equal to or higher than the second threshold temperature Ttth2, the CPU 62 engages the clutch 14 (S54) and stops generating the torque of the turning-side motor 56. In this way, the heat generation amount of the turning-side actuator 40 can be sufficiently reduced, and accordingly, it is possible to promptly decrease the temperature of the turning-side actuator 40.

A sixth embodiment will be described with reference to the drawings, with a focus on differences between the sixth embodiment and the fourth embodiment.

Figure 13:
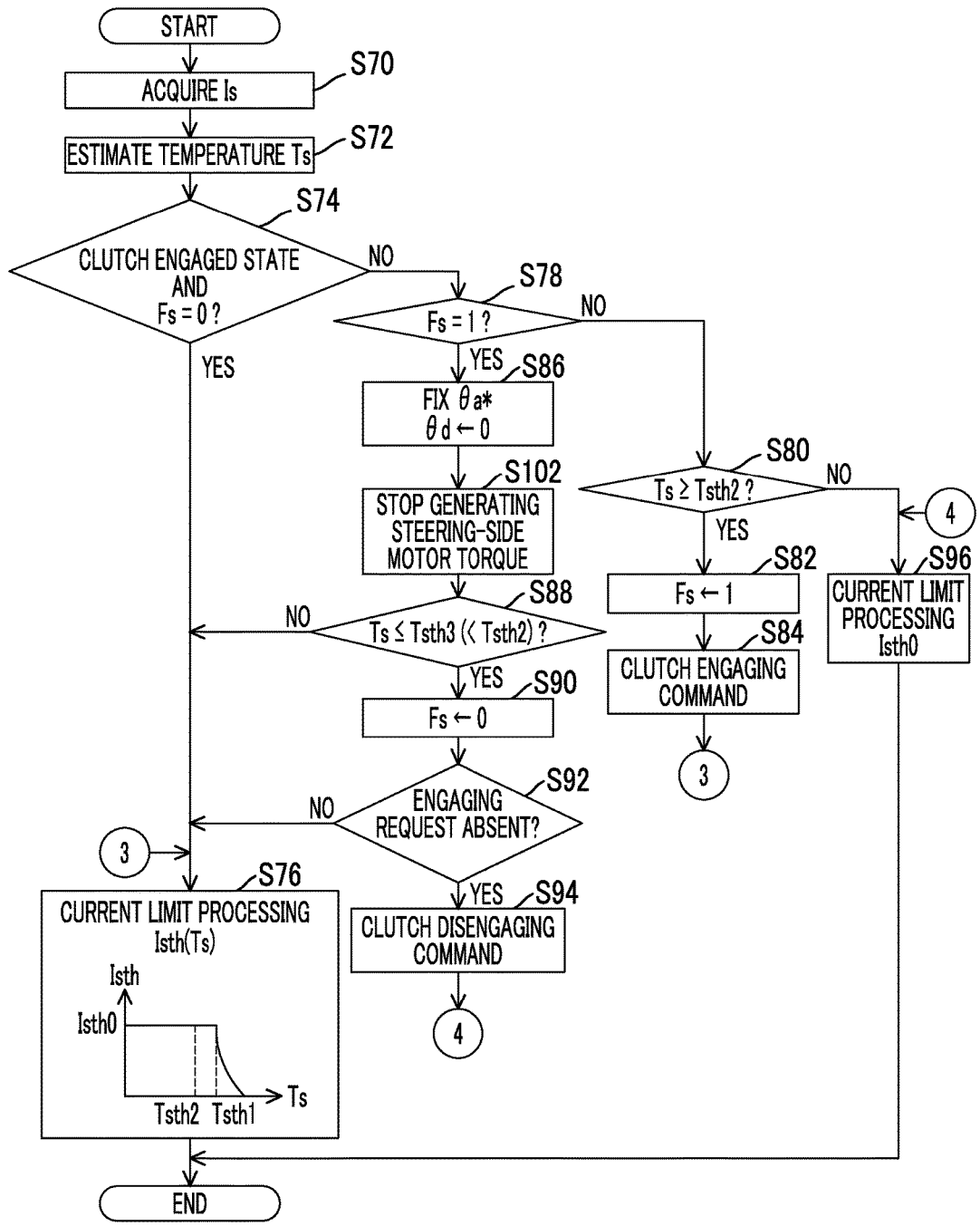
FIG. 13 is a flowchart showing a procedure of overheat suppression processing for a steering-side actuator according to a sixth embodiment.

FIG. 13 shows a procedure of processing for engaging and disengaging the clutch 14 on the basis of the temperature of the steering-side actuator 20. The processing shown in FIG. 13 is realized when the CPU 62 repeatedly executes the program stored in the memory 64 in specified cycles. Here, processing in FIG. 13 corresponding to that shown in FIG. 10 is denoted by the same step number for convenience of the description, and the description thereof will not be made.

In a series of the processing shown in FIG. 13, when the processing in S86 is completed, the CPU 62 stops generating the torque of the steering-side motor 26 (S102). This processing can be realized similarly to the processing in S24. Then, when the CPU 62 completes the processing in S102, the processing proceeds to the processing in S88. Note that, when the CPU 62 makes a negative determination in the processing in S88 or in the processing in S92, the processing proceeds to the processing in S76. However, because the current does not flow through the steering-side motor 26 in this case, the guard processing using the upper limit value Isth does not function.

Here, effects of this embodiment will be described. When the temperature Ts of the steering-side actuator 20 is equal to or higher than the second threshold temperature Tsth2, the CPU 62 engages the clutch 14 (S84) and stops generating the torque of the steering-side motor 26. In this way, the heat generation amount of the steering-side actuator 20 can be sufficiently reduced, and thus, it is possible to promptly decrease the temperature of the steering-side actuator 20.

The switching device may be regarded as the clutch 14 and the clutch driver 66, the acquisition processing may be regarded as the processing in S42 and S72, the current limit processing may be regarded as the processing in S46 and S76, and the switching processing may be regarded as the processing in S54 and S84.

The turning-side temperature acquisition processing may be regarded as the processing in S42. The assist processing may be regarded as the processing in which the manipulation signal MS s is generated and output by the manipulation signal generation processing section M26 on the basis of the assist torque Trqa* that is set by the assist torque setting processing section M6 when the clutch 14 is brought into the engaged state due to the processing in S54.

The processing in which the turning-side actuator is not used may be regarded as the processing in S100. The switching device may be regarded as the clutch 14 and the clutch driver 66. The switching temperature acquisition processing may be regarded as the processing in S12. The switching processing may be regarded as the processing in S16 to S20. The assist processing may be regarded as processing in which the manipulation signal MSt is generated by the manipulation signal generation processing section M38 on the basis of the turning angle command value θp* and is output to the turning-side actuator 40 when the processing in S24 shown in FIG. 8 is executed. The assist processing may be also regarded as processing in which the manipulation signal MS s is generated and output by the manipulation signal generation processing section M26 on the basis of the assist torque Trqa* that is set by the assist torque setting processing section M6, when the processing in S24a shown in FIG. 11 is executed.

The steering-side temperature acquisition processing may be regarded as the processing in S72. The assist processing may be regarded as processing in which the manipulation signal MSt is generated by the manipulation signal generation processing section M38 on the basis of the turning angle command value θp* and is output to the turning-side actuator 40 when the clutch 14 is in the engaged state due to the processing in S84.

Processing in which the steering-side actuator is not used may be regarded as the processing in S102. The steering angle command value setting processing may be regarded as the processing executed by the assist torque setting processing section M6, the processing executed by the addition processing section M8, the processing executed by the reaction force setting processing section M10, the processing executed by the deviation computation processing section M12, and the processing executed by the steering angle command value computation processing section M20. The steering-side control processing may be regarded as the processing executed by the steering angle feedback processing section M22, the processing executed by the addition processing section M24, and the processing executed by the manipulation signal generation processing section M26. The processing executed by the turning angle command value setting processing section may be regarded as the processing executed by the assist torque setting processing section M6, the processing executed by the addition processing section M8, the processing executed by the reaction force setting processing section M10, the processing executed by the deviation computation processing section M12, the processing executed by the steering angle command value computation processing section M20, the processing executed by the steering angle ratio variable processing section M28, the processing executed by the addition processing section M30, the processing executed by the derivative steering processing section M32, and the processing executed by the steering correction processing section M34. The steering-side control processing may be regarded as the processing executed by the turning angle feedback processing section M36 and the processing executed by the manipulation signal generation processing section M38. The variable setting processing may be regarded as the processing executed by the steering angle ratio variable processing section M28, the processing executed by the addition processing section M30, the processing executed by the derivative steering processing section M32, and the processing executed by the steering correction processing section M34. The stop processing may be regarded as the processing in S56 and S86.

Note that the above embodiments may be changed as follows. The current limit processing is not limited to the processing in which the upper limit value Itth is continuously reduced as the temperature Tt is increased in the case where the temperature Tt of the turning-side actuator 40 is equal to or higher than the first threshold temperature Ttth1. For example, processing in which the upper limit value Itth is reduced in a stepwise manner may be employed. The current limit processing is not limited to the processing in which the upper limit value Isth is continuously reduced as the temperature Ts is increased in the case where the temperature Ts of the steering-side actuator 20 is equal to or higher than the first threshold temperature Ttth1. For example, processing in which the upper limit value Isth is reduced in a stepwise manner may be employed.

The current limit processing is not limited to the processing in which the upper limit value is reduced when the temperature is high, as compared to the case where the temperature is low. Processing in which the actual current is limited to a smaller value than the current at the time when the temperature becomes equal to or higher than the first threshold temperature may be employed. The steering angle feedback processing section is not limited to a section that computes the feedback torque Trqr1* from the sum of the output values of the proportional element, the integral element, and the derivative element, which are obtained by using, as the input, the value obtained by subtracting the steering angle θh from the steering angle command value θh*. For example, the steering angle feedback processing section may compute the feedback torque Trqr1* from the sum of the output values of the proportional element and the derivative element, which are obtained by using, as the input, the value obtained by subtracting the steering angle θh from the steering angle command value θh*.

In the above embodiments, when the clutch 14 is disengaged, the sum of the feedback torque Trqr1* and the assist torque Trqa* is set as the manipulative variable for the steering-side actuator 20. However, the disclosure is not limited to this configuration. For example, the feedback torque Trqr1* may be set as the manipulative variable for the steering-side actuator 20. In addition, for example, open loop control in which the assist torque Trqa* is set as a torque command value for the steering-side motor 26 may be executed.

When the clutch 14 is engaged due to the high temperature Tt or the high temperature Tc, the manipulation signal MSs may not be generated on the basis of the manipulative variable in the steering angle feedback control. For example, when the processing of generating the torque of the turning-side motor 56 is stopped, the open loop control in which the assist torque Trqa* is set as the torque command value for the steering-side motor 26 may be executed. The assist torque Trqa*, which is set on the assumption that the clutch 14 is disengaged, may not be always an appropriate value when the clutch 14 is engaged. In this case, the assist torque Trqa* during the engagement of the clutch 14 may be set separately from the assist torque Trqa* during the disengagement of the clutch 14. Furthermore, the torque that is determined in accordance with the steering torque Trqs by processing similar to the processing executed by the assist torque setting processing section M6 may be allocated to the steering-side torque command value Trqr* and the turning-side torque command value Trqt*. The phrase "allocate A to the steering-side torque command value Trqr* and the turning-side torque command value Trqt*" does not mean "Trqr*+Trqt*=A", and means the following. That is, for example, when A is an amount having the same magnitude as the magnitude of torque of the rotational shaft 26a, the sum of a value equivalent to the torque of the rotational shaft 26a and the steering-side torque command value Trqr* becomes A, the value equivalent to the torque of the rotational shaft 26a being obtained by converting the turning-side torque command value Trqt* with the use of the rotational speed ratio between the rotational shaft 56a and the rotational shaft 26a.

When the temperature Ts is high, the assist processing may be executed with the use of only the steering-side actuator 20 while the current Is is limited to be equal to or smaller than the upper limit value Isth.

The steering-side temperature acquisition processing is not limited to the processing in which the temperature Ts is estimated on the basis of time-series data on the current Is at each time. For example, the steering-side temperature acquisition processing may be processing of acquiring a detected value of a temperature sensor that detects the temperature Ts of the steering-side actuator 20.

The turning angle feedback processing section is not limited to the turning angle feedback processing section that computes the manipulative variable (the turning-side torque command value Trqt*) for the turning-side actuator 40 from the sum of the output values of the proportional element, the integral element, and the derivative element, which are obtained by using, as the input, the value obtained by subtracting the turning angle θp from the turning angle command value θp*. For example, the turning angle feedback processing section may compute the manipulative variable for the turning-side actuator 40 from the sum of the output values of the proportional element and the derivative element, which are obtained by using, as the input, the value obtained by subtracting the turning angle θp from the turning angle command value θp*.

In the control of the turning-side actuator 40, the steering angle ratio variable processing section M28 may not execute the processing, and the derivative steering processing section M32 may not execute the processing when the clutch 14 is disengaged.

When the clutch 14 is engaged due to the high temperature Ts or the high temperature Tc, the manipulation signal MSt may not be generated on the basis of the manipulative variable in the turning angle feedback control. For example, the steering-side torque command value Trqt* may be set to torque (the manipulative variable in the open loop control) that is determined in accordance with the steering torque Trqs by the processing similar to the processing executed by the assist torque setting processing section M6. In addition, for example, the steering-side torque command value Trqt* may be set to the sum of the manipulative variable in the feedback control and the manipulative variable in the above open loop control. Note that the torque that is determined in accordance with the steering torque Trqs by processing similar to the processing executed by the assist torque setting processing section M6 may be allocated to the steering-side torque command value Trqr* and the turning-side torque command value Trqt*.

When the temperature Tt is high, the assist processing may be executed with the use of only the turning-side actuator 40 while the current It is limited to be equal to or smaller than the upper limit value Itth.

The turning-side temperature acquisition processing is not limited to the processing in which the temperature Tt is estimated on the basis of time-series data on the current It at each time. For example, the turning-side temperature acquisition processing may be processing of acquiring a detected value of a temperature sensor that detects the temperature Tt of the turning-side actuator 40.

The switching temperature acquisition processing is not limited to the processing in which the temperature Tc is estimated on the basis of time-series data of the current Ic at each time. For example, the switching temperature acquisition processing may be processing of acquiring a detected value of a temperature sensor that detects the temperature Tc of the switching device including the clutch 14 and the clutch driver 66.

For example, in the case where the processing of the steering angle ratio variable processing section M28 is not implemented, and the processing of the derivative steering processing section M32 is implemented, the processing executed by the derivative steering processing section M32 may be stopped after the clutch 14 is brought into the engaged state. In addition, for example, in the case where the processing of the derivative steering processing section M32 is not implemented and the processing of the steering angle ratio variable processing section M28 is implemented, the processing of varying the steering angle ratio executed by the steering angle ratio variable processing section M28 may be stopped after the clutch 14 is brought into the engaged state.

In the steering angle command value computation processing section M20, instead of setting the steering angle command value θh* with the use of the model equation expressed by the above equation (c1), the model equation that is expressed by the following equation (c2) may be used.

$$\Delta = K \cdot \theta h^* + C \cdot \theta h^{*\prime} + J \cdot \theta h^{*\prime\prime} \quad (c2)$$

Here, the spring coefficient K models the influence of the vehicle and is determined by the specifications of the suspension, the wheel alignment, and the like. For example, in the case where a turning angle command value computation processing section is provided, the steering angle command value θh* may be set to the value obtained by subtracting the target operation angle θa* from the turning angle command value θp1*.

For example, the turning angle command value computation processing section that computes the turning angle command value θp1* on the basis of the output value of the deviation computation processing section M12 by executing processing similar to the processing executed by the steering angle command value computation processing section M20 may be provided.

The processing of converting each of the steering angle θh and the turning angle θp to the rotation amount of the specified rotational shaft in the steering system 10 (for example, the rotation amount of the rotational shaft of the steering wheel 12) on the assumption that the clutch 14 is engaged may not be executed. However, in the case where this processing is not executed, it is necessary to variably set the target operation angle θa* when the steering angle ratio should be maintained to be constant due to, for example, the engaged state of the clutch 14.

What is claimed is:

1. A steering control device configured to control a steering system including a switching device that is switched between a transmission state and a cutoff state, the transmission state being a state where power is transmitted from a steering wheel to steered wheels, and the cutoff state being a state where transmission of the power from the steering wheel to the steered wheels is cut off; a steering-side actuator configured to apply a steering reaction force to the steering wheel in the cutoff state; and a turning-side actuator configured to turn the steered wheels, the steering control device comprising
    a controller configured to execute: turning processing of controlling a controlled variable to a command value corresponding to an operation of the steering wheel by controlling the turning-side actuator in the cutoff state, the controlled variable being at least one of a turning angle of the steered wheels and a turning angle rate that is a changing rate of the turning angle; and transmission switching processing of controlling the switching device such that the switching device is switched from the cutoff state to the transmission state on condition that an absolute value of a difference between the controlled variable and the command value continues to be equal to or larger than a threshold when the turning processing is executed.

2. The steering control device according to claim 1, wherein the controller is configured to execute assist processing of assisting in turning of the steered wheels caused by the operation of the steering wheel, with use of at least one of the steering-side actuator and the turning-side actuator in a case where the switching device is switched to the transmission state by the transmission switching processing.

3. The steering control device according to claim 2, wherein:
    in the turning processing, the turning-side actuator is controlled based on an output value of an integral element obtained by using, as an input, the difference between the controlled variable and the command value; and
    in the assist processing, in the case where the switching device is switched to the transmission state by the transmission switching processing, a value held by the integral element at a time point at which the switching device is switched to the transmission state is not reflected in control of the turning-side actuator.

4. The steering control device according to claim 1, wherein:
    in the turning processing, the controlled variable is the turning angle;
    the controller is configured to execute determination processing of determining whether the absolute value of the difference between the controlled variable and the command value continues to be equal to or larger than the threshold when the turning processing is executed by using, as inputs, a detected value of the turning angle and a command value of the turning angle; and
    the controller is configured to execute the transmission switching processing based on a result of the determination processing.

5. The steering control device according to claim 1, wherein the controller is configured to execute: acquisition processing of acquiring a temperature of one of the steering-side actuator and the turning-side actuator; current limit processing of limiting a current flowing through one of the steering-side actuator and the turning-side actuator in a case where the temperature acquired by the acquisition processing is equal to or higher than a first threshold temperature when the switching device is in the transmission state; and switching processing of controlling the switching device such that the switching device is switched from the cutoff state to the transmission state in a case where the temperature acquired by the acquisition processing is equal to or higher than a second threshold temperature that is lower than the first threshold temperature when the switching device is in the cutoff state.

6. The steering control device according to claim 5, wherein:
    the acquisition processing is turning-side temperature acquisition processing of acquiring the temperature of the turning-side actuator; and
    the controller is configured to execute assist processing of controlling at least one of the steering-side actuator and the turning-side actuator to assist in turning of the steered wheels caused by the operation of the steering wheel in a case where the switching device is switched to the transmission state by the switching processing.

7. The steering control device according to claim 6, wherein the controller is configured not to use the turning-side actuator in the assist processing in the case where the switching device is switched to the transmission state by the switching processing.

8. The steering control device according to claim 5, wherein:
    the controller is configured to execute switching temperature acquisition processing of acquiring a temperature of the switching device;
    the switching device is a normally-closed switching device;
    the switching processing includes processing of controlling the switching device such that the switching device is switched from the cutoff state to the transmission state in a case where the temperature acquired by the switching temperature acquisition processing is equal to or higher than a specified temperature when the switching device is in the cutoff state; and the controller is configured to execute assist processing of controlling at least one of the steering-side actuator and the turning-side actuator to assist in turning of the steered wheels caused by the operation of the steering wheel in a case where the switching device is switched to the transmission state by the switching processing based on a fact that the temperature acquired by the switching temperature acquisition processing is equal to or higher than the specified temperature.

9. The steering control device according to claim 5, wherein:

the acquisition processing is steering-side temperature acquisition processing of acquiring the temperature of the steering-side actuator; and the controller is configured to execute assist processing of controlling at least one of the steering-side actuator and the turning-side actuator to assist in turning of the steered wheels caused by the operation of the steering wheel in a case where the switching device is switched to the transmission state by the switching processing.

10. The steering control device according to claim 9, wherein the controller is configured not to use the steering-side actuator in the assist processing in the case where the switching device is switched to the transmission state by the switching processing.

11. The steering control device according to claim 5, wherein the controller is configured to execute:

steering angle command value setting processing of setting a steering angle command value based on the operation of the steering wheel;

steering-side control processing of controlling the steering-side actuator to control a steering angle to the steering angle command value through feedback;

turning angle command value setting processing of setting a turning angle command value based on the operation of the steering wheel;

turning-side control processing of controlling the turning-side actuator to control the turning angle to the turning angle command value through feedback;

variable setting processing of variably setting a command value of a steering angle ratio that is a ratio between the turning angle command value and the steering angle command value when the switching device is in the cutoff state; and stop processing of stopping variably setting the ratio between the turning angle command value and the steering angle command value in a case where the switching device is switched to the transmission state by the switching processing.

* * * * *